US010266667B2

(12) United States Patent
Lorgouilloux et al.

(10) Patent No.: US 10,266,667 B2
(45) Date of Patent: Apr. 23, 2019

(54) FLAME-RETARDANT AND FIRE-RESISTANT POLYMER COMPOSITIONS MADE FROM LIME HAVING A HIGH SPECIFIC SURFACE

(71) Applicant: S.A. Lhoist Recherche et Developpement, Ottignies-Louvain-la-Neuve (BE)

(72) Inventors: Marion Lorgouilloux, Strepy Bracquegnies (BE); Didier Lesueur, Braine-le-Chateau (BE); Marc Pelletier, Saint-Mande (FR); Fouad Laoutid, Lambersart (FR); Philippe Dubois, Braives (BE)

(73) Assignee: S. A. Lhoist Recherche et Developpement, Ottignies-Louvain-la (BE)

( * ) Notice: Subject to any disclaimer, the term of this patent is extended or adjusted under 35 U.S.C. 154(b) by 447 days.

(21) Appl. No.: 14/406,915

(22) PCT Filed: Jul. 12, 2013

(86) PCT No.: PCT/EP2013/064791
§ 371 (c)(1),
(2) Date: Dec. 10, 2014

(87) PCT Pub. No.: WO2014/009526
PCT Pub. Date: Jan. 16, 2014

(65) Prior Publication Data
US 2015/0158991 A1      Jun. 11, 2015

Related U.S. Application Data

(60) Provisional application No. 61/696,967, filed on Sep. 5, 2012.

(30) Foreign Application Priority Data

Jul. 12, 2012   (BE) .................................. 20120486

(51) Int. Cl.
*C08K 3/22*   (2006.01)
*C08K 3/26*   (2006.01)
(Continued)

(52) U.S. Cl.
CPC .................. *C08K 3/22* (2013.01); *C08K 3/26* (2013.01); *C09K 3/00* (2013.01); *C09K 21/02* (2013.01);
(Continued)

(58) Field of Classification Search
CPC ...................................................... C09K 21/02
See application file for complete search history.

(56) References Cited

U.S. PATENT DOCUMENTS

2005/0113500 A1   5/2005   Okosni et al.
2006/0158428 A1   8/2006   Wakabayeshi et al.
(Continued)

FOREIGN PATENT DOCUMENTS

DE     102009034700 A1    4/2010
EP         1896364 A2     3/2008
WO   WO 2010073595 A1 *  7/2010  .............. C08L 77/00

OTHER PUBLICATIONS

English machine translation of Kraeuter, DE 10 2009 034 700 A1 (2010).*
(Continued)

*Primary Examiner* — Peter F Godenschwager
(74) *Attorney, Agent, or Firm* — Whitaker Chalk Swindle & Schwartz PLLC; Charles Gunter

(57) ABSTRACT

A flame-retardant polymer composition comprising a mineral filler and a polymer, said mineral filler comprising a calcium compound, characterized in that the calcium compound is a fire-resistant additive in the form of calcium hydroxide, having a specific surface calculated according to the BET method greater than 25 m²/g, preferably greater
(Continued)

than 30 m2/g, more preferably greater than 35 m2/g and advantageously greater than 40 m2/g, uses of same and the combustion residue obtained.

14 Claims, 16 Drawing Sheets

(51) Int. Cl.
*C09K 3/00* (2006.01)
*C09K 21/02* (2006.01)

(52) U.S. Cl.
CPC ........... *C08K 2003/2206* (2013.01); *C08K 2003/2224* (2013.01); *C08K 2003/265* (2013.01); *C08K 2201/006* (2013.01); *C08K 2201/014* (2013.01); *Y10T 428/2982* (2015.01)

(56) References Cited

U.S. PATENT DOCUMENTS

2010/0160541 A1* 6/2010 Herbiet .................... C01F 7/02
 524/585
2011/0257313 A1* 10/2011 Seki ........................ C08L 77/00
 524/126

OTHER PUBLICATIONS

PCT/2013/064791 International Search Report, dated Oct. 10, 2013, 3 pages, European Patent Office.

* cited by examiner

FLAME-RETARDANT AND FIRE-RESISTANT POLYMER COMPOSITIONS MADE FROM LIME HAVING A HIGH SPECIFIC SURFACE

The present invention relates to the field of mineral fillers to be added to polymers in order to form flame-retardant polymer compositions. More particularly, the present invention relates to flame-retardant polymer compositions comprising a polymer and a mineral filler comprising a calcium compound.

Fillers stemming from dolomite to be added in plastics for their antimicrobial capability of capturing HCl during incineration of plastics are known from document US 20060188428.

Flame-retardant additives or fire-retardant additives or further fire-retarding treatments are incorporated into polymer matrices in order to slow down or stop combustion of the polymer in the case of a fire.

For example from document DE 102009034700, the use of dolomite compounds as flame-retardants is known, when they are added to polymeric compositions.

A distinction is made inter alia from two categories of effects of these flame-retardant additives (called fillers in the following text), i.e. chemical effects and physical effects.

From among the chemical effects, acceleration of the breaking of the chains of the polymer under the effect of temperature is found which leads to a molten polymer which will drip and leave the hot area of the fire. In the case of systems based on phosphorus-containing flame-retardants, the formation of a non-cohesive charring layer is found by reaction between the filler and the polymer; this layer is then used as a barrier and prevents the evolvement of combustible gases which feed the fire. Also, fillers are again found which, during the rise in temperature, release non-flammable compounds or which trap free radicals present in the gaseous phase. Some of these chemical effects are obtained by using halogenated fillers (bromides and chlorides) which are gradually abandoned for toxicological and environmental reasons.

Among the physical effects, the reaction of endothermic decomposition of the filler is found which causes cooling of the polymer and release of inert gases like steam or carbon dioxide which will then act as diluents for oxidizing and combustible gases. Finally, the formation of a protective layer with low cohesion is also found from the degradation of the filler, a layer which will again prevent the release of combustible gases. These physical effects are generally obtained with mineral fillers.

Generally, the compositions comprising mineral fillers on the one hand and polymers on the other hand should have certain features so as to be practically applicable. First of all, the flame-retardant effect should be able to be quantified in order to evaluate the benefit of such compositions. The standardized method of the cone calorimeter (ISO 5660-1 or ASTM E 1354) is used for determining the evolvement of heat (noted as HRR for Heat Rate Release and expressed in $kW/m^2$) of a polymer composition optionally containing mineral fillers, when the latter is exposed to a controlled level of radiant heat. This method, called hereafter a «fire test», further allows determination of the flammability, the mass loss, the production of fumes, or further, the combustion heat of a composition. For a filled polymer, a not very large amount of heat expresses a good flame-retardant effect of the mineral fillers.

There exist other methods for evaluating the flame-retardant effect such as LOI (Limiting Oxygen Index, according to the ASTM D 2863 standard), the so-called uepiradiator test (NF P92-505) or further methods which generally correspond to specific applications of filled polymers (cables, electric equipment, electric accessories . . . ) among which the inflammation test UL94, the various methods of the so-called « incandescent wire» test (IEC 60695-2), the cone calorimeter adapted to cables (EN 50399) . . . .

Moreover, given the high proportion of these mineral fillers in the compositions, it is important to evaluate the impact that mineral fillers will have on the mechanical properties of polymeric compositions. Consequently, the filled polymers should have acceptable mechanical strength (traction, impact) characteristics.

For a number of polymeric matrices, the mechanical properties of flame-retardant polymeric compositions with the addition of fillers may be improved by a surface treatment of said fillers before their incorporation into the polymeric matrix.

The most common mineral fillers to be used with polymers in order to obtain a flame-retardant effect are mainly aluminium trihydroxide $Al(OH)_3$, also called ATH and magnesium dihydroxide $Mg(OH)_2$, also called MDH.

Document US 2005/188428 for example describes the use of aluminium trihydroxide, magnesium hydroxide and calcium dihydroxide as a flame-retardant additive. This document is focused on the size of the particles by mentioning their Blaine (§ 29) specific surface area for facilitating incorporation and consumption of the mineral filler in the polymer. Further, it is specified that the addition of fine particles may improve the flame-retardant effect.

If both of these (aluminium and of magnesium) hydroxides have an efficient flame-retardant effect because of their particular properties which lead to the physical effects listed above, on the other hand, they do not have any effect on the cohesion of the combustion residue. At the end of that combustion, polymer compositions loaded with ATH or MDH appear as a non-cohesive, blackgrey ash (consisting of magnesium or aluminium oxide and of charred polymer residues), which is reduced to dust under the least mechanical stress.

Calcium dihydroxide $Ca(OH)_2$, often obtained by hydration (slaking) of quicklime, is decomposed in an endothermic way (consumption of 900 kJ/kg) around 400° C., releasing water and giving rise to the formation of an oxide, CaO. $Ca(OH)_2$ consequently appears as a mineral hydroxide having all the required properties for being used as a flame-retardant filler. However, the decomposition temperature of $Ca(OH)_2$ is high as compared with those of ATH and of MDH, and $Ca(OH)_2$ is therefore efficient as a flame-retardant only at a relatively high temperature, the risk being that at this temperature, the polymer is already totally degraded. Moreover, because of its strong basicity (pH greater than 12), $Ca(OH)_2$ may be used as a filler only in polymeric matrices for which properties are not degraded in contact with particles of high pH.

$Ca(OH)_2$ is consequently less common than ATH and MDH.

The characterization of the combustion residues obtained after calcination of filled polymeric compositions, in certain cases called charred residues, will allow evaluation of the usefulness of certain fillers in polymer compositions with view to certain applications.

The condition of the combustion residue of polymeric compositions has been studied a lot these recent years. Indeed it is advantageous to have polymeric compositions which, in addition to being flame-retardants, retain their shape during fire. In particular, in the case of plastic parts used in the electric or electronic fields (electric or electronic equipment, electric cables and/or communication cables . . . ) and especially in the field of electric cable claddings in polymers, when it is preferable that during the course of a fire, the cable sheath remains around the conductive cable so as to continue to ensure the operation thereof and in order to avoid short-circuits.

At the present time, there is no standard definition of the cohesion of combustion residues from polymeric compositions. In the sense of the invention, by «cohesive residue» is meant a combustion residue which is not an ash, neither dust, nor powder, but actually a cohesive solid having some unity (as opposed to a divided solid). This residue globally has the same 'shape' and occupies the same place as the initial polymer composition from which it stems. In particular, this residue may be porous and because of this assimilated to an intumescent residue. When such a residue is obtained, this is referred to as a fire-resistant effect, sometimes called a ceramizing effect. This cohesive residue is a residue which, after combustion according to the standardized method of the cone calorimeter ISO 5660-1 or ASTM E 1354, is only crossed by a very limited number of cracks, of less than or equal to 3, preferably less than or equal to 2, or even to 1 and more preferentially 0.

Advantageously, this residue may, in addition to its cohesion, have a certain compressional mechanical strength, more simply called in the following a «mechanical strength».

At the present time, it seems that the combination of a flame-retardant effect and of a fire-resistant effect leading to the formation of a cohesive residue, although highly sought and appreciated, is only obtained in the presence of complex formulations containing ATH or MDH as a flame-retardant filler, associated with nanoparticles (clays, carbon nanotubes, silica . . . ), zinc borate . . . as a fire-resistant or ceramizing agent. These ceramizing agents are costly, difficult to incorporate into the polymer and for a number of them have an unfavorable ecotoxic profile which limits their use and makes it necessary to search for substitutes.

Calcium mineral fillers have already been described in the prior art. For example, the document of Ashley et al, published in «Plastic, Rubber and Composites Processing and Application, Volume 15, no. 1, 1991» discloses a comparative study of various mineral fillers in an ethylene vinyl acetate (EVA) which is generally the reference polymer. This document discloses that calcium hydroxide is potentially of interest because of its endothermic decomposition but it however has a limited effect on the oxygen index (LOI) of EVA. On the other hand, a hard ash is formed when using $Ca(OH)_2$. This ash was analyzed and in majority consists of calcium carbonate $CaCO_3$. The hard ash obtained at the end of the combustion is thus assumed to be the result of the reaction between calcium hydroxide and the $CO_2$ produced during combustion.

These results, i.e. a limited flame-retardant effect (on LOI and on the ignition time) and the formation of a hard ash consisting in majority of $CaCO_3$, were confirmed in other polymeric matrices. However, as the carbonation reaction of $Ca(OH)_2$ into $CaCO_3$ is exothermic, the authors draw the conclusion that it is not relevant to use $Ca(OH)_2$ as a flame-retardant.

The document of Focke et al. published in «Journal of Chemical Engineering, Volume 9, no. 2, 1997» as for it, evaluates various mineral fillers as a flame-retardant. Several compounds are compared, notably aluminium hydroxide, boric acid, calcium hydroxide, calcium sulfate, colemanite (calcium borate), magnesium hydroxide, zinc borate and a compound called UltraCarb which is a finally divided mixture of huntite (of formula $CaMg_3(CO_3)_4$) and hydromagnesite (of formula $Mg_5(CO_3)_4(OH)_2 \cdot 4H_2O$).

Three parameters were studied for each of these fillers: the cooling of the substrate (endothermic effect of the decomposition of the filler), dilution of the combustion gases with inert gases (release of water and/or of $CO_2$ by the filler) and the formation of an ash-char barrier layer, in particular in this document.

Certain fillers which are highly effective for cooling and diluting gases on the other hand prove to be unfavorable for forming the ash-char barrier layer. Indeed, the oxides formed during the decomposition of the hydroxides catalyze the oxidation of the ash-char barrier layer, leading to less charring for filled polymers than for unfilled polymers and thereby limiting the barrier effect, which however improves the flame-retardant nature of the compositions.

Among the hydroxides giving rise to this phenomenon, Ca hydroxide is the one which leads to better charring, not that the oxidation is less, but because of the formation of $CaCO_3$ by reaction of the CaO formed during the decomposition with the formed $CO_2$ during the combustion of the polymer. In the list of tested fillers, only boric acid does not catalyze the oxidation of the charred layer and leads to the formation of cohesive charring and to a glassy residue. All the other fillers lead to the formation of powdery residues.

As $CaCO_3$ is considered as a catalyst of the exothermic degradation of polyolefins, carbonation of CaO during the use of $Ca(OH)_2$ as a filler may be seen as a reaction promoting combustion. The authors draw the conclusion that $Ca(OH)_2$ can therefore only be used as a flame-retardant.

Both of these documents disclose the formation of $CaCO_3$ during the combustion of polymeric compositions filled with $Ca(OH)_2$. Because of this carbonation, they do not recommend the use of $Ca(OH)_2$ as a flame-retardant filler, because the carbonation reaction is exothermic on the one hand and because $CaCO_3$ is considered as a catalyst of the degradation reaction of polyolefins on the other hand. In both of these cases, the combustion residues obtained in the presence of $Ca(OH)_2$ are not cohesive, but powdery, the actual definition of an ash being 'a powder resulting from the combustion of certain materials'. Moreover, no reference is ever made in these documents to the porosity of the fillers used, in particular to the specific surface area or to the pore volume of calcium hydroxides.

The object of the present invention is therefore to propose mineral fillers comprising at least one calcium compound in order to benefit from its advantages notably in terms of endothermicity (flame-retardant effect) while allowing acceptable mechanical characteristics for the polymeric composition containing the mineral filler and which allows formation of a cohesive combustion residue (fire-resistant effect), without requiring resorting to costly ceramizing agents and difficult to incorporate.

For this purpose, the flame-retardant polymeric composition according to present invention is characterized in that the calcium compound is a fire-resistant additive in the form of calcium hydroxide having a specific surface area computed according to the BET method greater than 25 $m^2/g$, preferably greater than 30 $m^2/g$, more preferentially greater than 35 $m^2/g$ and advantageously greater than 40 $m^2/g$. The specific surface area is particularly less than 60 $m^2/g$, notably less than 55 $m^2/g$.

Indeed, it appeared according to the present invention that the high specific surface area of calcium hydroxide allowed the formation of a particularly cohesive and possibly intumescent combustion residue. Indeed, during decomposition of the polymeric matrix, strong concentrations of $CO_2$ are released into the atmosphere of the combustion area. This $CO_2$ is rapidly captured by the initially present $Ca(OH)_2$ in the filler of the composition according to the invention since $Ca(OH)_2$ has a large specific surface area and therefore a high gas adsorption capacity, in order to form calcium carbonate of formula $CaCO_3$. This $CaCO_3$ is a cohesive solid which does not collapse as ashes as is the case of the residue obtained at the end of combustion for compositions based on ATH or MDH. For a same polymeric matrix, the strength of the cohesive solid based on $CaCO_3$ is all the higher since the specific surface area of the Ca hydroxide used as a filler in the polymeric composition is large.

This cohesive and possibly intumescent combustion residue, based on calcium carbonate, unlike the non-cohesive combustion residues obtained with ATH or MDH, is particularly efficient in certain applications, such as for example that of cladded electric cables where the cohesive residue will protect the electric cables from fire damage and short-circuits allowing the sheath of the cable to continue to play its protective role even at high temperatures.

The high specific surface area of the calcium filler promotes its carbonation reaction during the combustion of the composition according to the invention, and actually allows a highly significant capture of combustion gases which are captured in the mineral filler and cause the cohesion and the intumescent effect of the combustion residue. This capture of the combustion gases has a double effect. On the one hand, it leads to the formation of a still more cohesive possibly intumescent residue as described earlier. On the other hand, the capture of $CO_2$ during the combustion displaces the combustion equilibrium towards the formation of $CO_2$ to the expense of CO, reducing the toxicity of the fumes. This is a positive additional effect related to the presence of $Ca(OH)_2$ with a high specific surface area, in the flame-retardant polymeric composition according to the invention.

The calcium hydroxide used in the sense of the present invention is in particular hydrated lime also called slaked lime. This calcium compound is a generally powdery compound forming a set of solid particles, mainly consisting of calcium hydroxide $Ca(OH)_2$.

This slaked lime may of course contain impurities, i.e. phases derived from $SiO_2$, $Al_2O$, $Fe_2O_3$, MnO, $P_2O_5$, $K_2O$ and/or $SO_3$ in an amount of a few tens of grams per kilogram. Nevertheless, the sum of these impurities, expressed as the aforementioned oxides, does not exceed 5%, preferably 3%, preferably 2% or even 1% by weight of the mineral filler according to the invention. In particular, the slaked lime advantageously contains less than 1.0% by mass of $Fe_2O_3$, preferably less than 0.5% and preferably less than 0.3%, so as to not modify significantly the color of the flame-retardant polymeric composition.

This slaked lime may also contain calcium oxide which would not have been hydrated during the preparation of slaked lime according to invention, just as it may contain calcium carbonate $CaCO_3$. This calcium carbonate may either stem from the initial limestone from which is derived the slaked lime according to invention (unfired substances), or from a partial carbonation reaction of slaked lime in contact with air during its preparation method and notably during its drying. The calcium oxide content in the slaked lime according to the invention is generally less than 3% by mass, preferably less than 2% and advantageously less than 1%. That of calcium carbonate is less than 15% by mass, preferably less than 10% and advantageously less than 6%, more advantageously less than 4%. The slaked lime may contain free water, i.e. not chemically bound to the compound, up to about 50 g/kg.

Generally, the size of the particles of this slaked lime in powdery form is entirely less than 1 mm and often less than 250 μm. In particular, when the size of the particles is measured by laser grain size determination (after dispersing the product in methanol without any de-agglomeration step with ultrasound), $d_{90}$, which corresponds to the diameter (in μm) for which 90% by volume of the particles of the powdery material are smaller, is preferably less than 80 μm, advantageously less than 60 μm. Also, $d_{97}$ which corresponds to the diameter (in μm) for which 97% by volume of the particles of the powdery material are smaller, is preferably less than 200 μm, advantageously less than 100 μm. The smaller the particles, the better they will be dispersed in the polymeric matrix.

A slaked lime with a high specific surface area may be obtained according to the teaching of document U.S. Pat. No. 5,492,685 which discloses the obtaining of slaked limes with a very high specific surface area >35 m$^2$/g and which may range beyond 75 m$^2$/g which are obtained by hydration in the presence of alcohol. In a similar way, the slaked lime may also be obtained according to the teaching of document U.S. Pat. No. 5,173,279 by slaking of quicklime in the presence of a glycol or of an amine. This gives the possibility of obtaining slaked limes with a high specific surface area (greater than 25 m$^2$/g).

In particular, the slaked lime according to the invention, in addition to the high specific surface area described earlier, has a high porous volume. By 'porous volume', is meant the volume of the pores for which the size is comprised between 17 and 1000 Å (1.7 and 100 nm), measured by nitrogen adsorption manometry and computed according to the BJH method. In particular, the porous volume of the slaked lime according to the invention is comprised between 0.10 and 0.30 cm$^3$/g, preferably greater than 0.15 cm$^3$/g, more advantageously greater than 0.20 cm$^3$/g. The porous volume is in particular less than 0.25 cm$^3$/g.

The calcium hydroxide, preferably as hydrated lime, with a high specific surface area is for example obtained according to the teaching of international patent application WO97/14650 by slaking in the presence of a large amount of water and by subsequent drying with grain size cut-off or milling.

Advantageously, said mineral filler of the flame-retardant polymeric composition further comprises at least one magnesium compound, as a magnesium hydroxide, as a flame-retardant additive.

In this way, the flame-retardant effect of the filler is improved as compared with the use of mineral fillers only comprising a calcium compound as described in the invention. Indeed, the endothermic decomposition of $Mg(OH)_2$ occurs in a lower range of temperatures than the decomposition of $Ca(OH)_2$, a temperature range which corresponds to the range of temperatures in which the majority of polymers degrade. The fire resistant effect is on the other hand more or less reduced depending on the proportion of $Mg(OH)_2$ in the filler, since the cohesion of the combustion residue is related to the calcium compound, to its proportion in the composition and to its properties.

In a particular embodiment, the calcium compound and the magnesium compound of said mineral filler of the flame-retardant polymeric composition are two separate compounds in a mixture.

Advantageously, the calcium compound, which is found as a slaked lime with high specific surface area, and the magnesium compound of said mineral filler of the flame-retardant polymeric composition are intimately bound and stem from slaking of quicklime with a suspension of magnesium hydroxide.

In such a case, the magnesium hydroxide stemming from the slaking composition is incorporated into the solid phase of the calcium hydroxide particles.

Said mineral filler, in which the calcium compound is intimately bound to the magnesium compound, allows homogeneity of the fire-resistant and flame-retardant properties of the flame-retardant polymeric composition according to the present invention.

Moreover, if MgO is still present at the end of the slaking of quicklime with a magnesium hydroxide suspension, it will be present in an amount of less than 2% from the moment that this is then a phase of impurities.

Preferably, said mineral filler comprising a calcium compound and a magnesium compound intimately bound has the general formula $xCa(OH)_2 \cdot yMg(OH)_2 \cdot zI$, wherein x, y, and z are mass proportions with y=0.4 to 58.0%, the sum of x, y and z having the value of 100% and the sum of x and y being greater than or equal to 88%, preferably 90%, more particularly 92%, advantageously 95%, in particular 97% and extremely preferentially greater than 98%. I represents the impurities which may be present in the mineral filler according to present invention such as phases derived from $SiO_2$, $Al_2O$, $Fe_2O_3$, MnO, $P_2O_5$, $K_2O$ and/or $SO_3$ essentially stemming from the slaked lime in an amount of a few tens of grams per kilogram, or further calcium oxide which would not have been hydrated during the preparation of slaked lime, calcium carbonate either stemming from the initial limestone from which is derived the slaked lime (unfired), or from a partial carbonation reaction of the slaked lime in contact with air or further free water.

Generally, the impurities are present in a content of less than or equal to 12%, more particularly 10%, preferably less than or equal to 8%, advantageously less than or equal to 5%, in particular less than or equal to 3% and more advantageously in an amount of less than 2% by weight, based on the total weight of the composition. The mineral filler comprising a calcium compound and a magnesium compound, preferably intimately bound, may contain free water, i.e. not chemically bound to the compound, up to about 50 g/kg.

The mineral filler according to the invention, comprising a calcium compound and a magnesium compound, preferably intimately bound, has high specific surface area and high porous volume. Their specific surface area is greater than 20 $m^2/g$, preferably greater than 25 $m^2/g$, in particular greater than 30 $m^2/g$ and less than 50 $m^2/g$, in particular less than 45 $m^2/g$, notably less than 40 $m^2/g$, or even less than 35 $m^2/g$. Their porous volume is greater than 0.10 $cm^3/g$, preferably greater than 0.11 $cm^3/g$, advantageously greater than 0.13 $cm^3/g$ and less than 0.25 $cm^3/g$, in particular less than 0.20 $cm^3/g$, notably less than 0.18 $cm^3/g$, or even less than 0.16 $cm^3/g$.

The slaking of quicklime with an $Mg(OH)_2$ suspension is carried out according to a method inspired from the method described in WO97/14650 (slaking in the presence of a large amount of water and subsequent drying with grain size cutoff or possible milling), but wherein the hydration water is replaced with an $Mg(OH)_2$ suspension. During the synthesis, $Mg(OH)_2$ does not undergo any modification. Because of the excess of hydration water used, the calcium portion of the obtained product at the end of the synthesis is present as $Ca(OH)_2$ with a high specific surface area and porous volume. The thereby synthesized product is therefore an intimate mixture between an $Mg(OH)_2$ with standard properties and a $Ca(OH)_2$ with high specific surface area and porous volume. The mixed product accordingly has also high specific surface area and porous volume, which depends on the mass proportions of $Mg(OH)_2$ and of $Ca(OH)_2$ in the mixture and on their respective specific surface areas and porous volumes.

At the end of the preparation of the mineral filler by slaking of quicklime with a suspension of magnesium hydroxide, this filler comprising a calcium compound and a magnesium compound intimately bound may be dried and/or de-agglomerated and/or milled and/or separated in order to adjust its grain size. The size distribution of the particles of this filler is then comparable with that of the calcium compound as slaked lime with a high specific surface area as described above.

The polymer of the composition according to the invention may be of the thermoplastic, thermosetting or elastomeric type of natural or synthetic origin. It may for example be selected from polyethylene, polypropylene, polystyrene, ethylene and propylene copolymer (EPR), ethylene-propylenedene terpolymer (EPDM), ethylene and vinyl acetate copolymer (EVA) with low/medium acetate content (<28%, preferably <24%, preferentially <20% and further still more preferentially <14%), an ethylene and methyl acrylate copolymer (EMA) with low/medium acrylate content, an ethylene and ethyl acrylate copolymer (EEA) with low acrylate content, an ethylene and butyl acrylate copolymer (EBA) with low acrylate content, an ethylene and octene copolymer, a polymer based on ethylene, a polymer based on polypropylene, a polymer based on polystyrene, a halogenated polymer, a silicone or any mixture of these compounds.

The mineral filler according to present invention is incorporated into the flame-retardant polymer composition in an amount from 1 to 80% by weight, advantageously from 40 to 75% by weight, based on the total weight of said flame-retardant polymer composition.

The polymeric composition according to the present invention may further have improved mechanical strength (elongation at break . . . ) by a surface treatment of the mineral filler with a covering agent or a coupling agent. Compatibilization techniques for filler/polymer with a surface treatment are known, notably those resorting to fatty acids and that resorting to silanes.

Other embodiments of the flame-retardant polymeric composition according to the invention are indicated in the appended claims.

The object of the invention is also a use of a mineral filler comprising a calcium compound in the form of calcium hydroxide having a specific surface area computed according to the BET method greater than 25 $m^2/g$, preferably greater than 30 $m^2/g$, more preferentially greater than 35 $m^2/g$, and even more preferentially greater than 40 $m^2/g$, as a fire-resistant additive for a flame-retardant polymeric composition.

More particularly, in the use according to the present invention, said mineral filler further comprises at least one magnesium compound, in the form of a magnesium hydroxide, as a flame-retardant additive for a flame-retardant polymeric composition.

In another advantageous use according to the present invention, the calcium compound and the magnesium compound of said mineral filler are two separate compounds mixed together.

In an advantageous alternative of the use according to the invention, the calcium compound and the magnesium compound of said mineral filler are intimately bound, from slaking of quicklime with a suspension of magnesium hydroxide.

The mineral filler according to the invention, comprising a calcium compound and a magnesium compound, preferably intimately bound, have high specific surface area and porous volume. Their specific surface area is greater than 20 m$^2$/g, preferably greater than 25 m$^2$/g, in particular greater than 30 m$^2$/g and less than 50 m$^2$/g, in particular less than 45 m$^2$/g, notably less than 40 m$^2$/g, or even less than 35 m$^2$/g. Their porous volume is advantageously greater than 0.10 cm$^3$/g, preferably greater than 0.11 cm$^3$/g, advantageously greater than 0.13 cm$^3$/g and less than 0.25 cm$^3$/g, in particular less than 0.20 cm$^3$/g, notably less than 0.18 cm$^3$/g, or even less than 0.16 cm$^3$/g.

Preferably, said mineral filler comprising a calcium compound and a magnesium compound, intimately bound, has the general formula xCa(OH)$_2$.yMg(OH)$_2$.zI, wherein x, y, and z are mass proportions with y=0.4 to 58.0%, the sum of the x, y and z having the value of 100% and the sum of x and y being greater than or equal to 88%, in particular 90%, preferably 92%, advantageously 95%, in particular 97% and extremely preferentially greater than 98%. I represents the impurities which may be present in the mineral filler according to the present invention.

In an embodiment of the use according to the invention, said polymer is an organic polymer, in particular an organic polymer of the thermoplastic, thermosetting or elastomeric type, of natural or synthetic origin. It may for example be selected from a polyethylene, a polypropylene, a polystyrene, a copolymer of ethylene and propylene (EPR), an ethylene-propylenediene terpolymer (EPDM), an ethylene and vinyl acetate copolymer (EVA) with low/medium acetate content (<28%, preferably <24%, more preferentially <20% and still even more preferentially <14%), an ethylene and methyl acrylate copolymer (EMA) with low/medium acrylate content, an ethylene and ethyl acrylate copolymer (EEA) with low acrylate content, an ethylene and butyl acrylate copolymer (EBA) with low acrylate content, an ethylene and octene copolymer, a polymer based on ethylene, a polymer based on polypropylene, a polymer based on polystyrene, a halogenated polymer, a silicone or any mixture of these compounds.

In an embodiment of the use according to the invention, the mineral filler according to the present invention is incorporated into the flame-retardant polymer composition in an amount from 1 to 80% by weight, advantageously from 40 to 75% by weight, based on the total weight of said flame-retardant polymeric composition.

According to the invention, the particles of the mineral filler have a particle size d$_{90}$ of less than 80 µm, preferably less than 60 µm.

It is understood that the mineral filler according to the invention may be used in combination with conventional flame-retardant fillers of the ATH or MDH type, as a flame-retardant associated with fire-resistance.

In a preferential embodiment of use according to the invention, the particles of the mineral filler have a particle size d$_{97}$ of less than 200 µm, preferably less than 100 µm.

Other embodiments of the use according to the invention are indicated in the appended claims.

The invention finally relates to a combustion residue of a flame-retardant polymeric composition according to the invention, characterised in that the residue is a cohesive residue having a determined average compressive break mechanical strength which is greater than 3 kPa, preferably greater than 8 kPa, preferentially greater than 20 kPa and more advantageously greater than 60 kPa.

Advantageously, this cohesive combustion residue is a residue which is only crossed by a very limited number of cracks, of less than or equal to 3, preferably less than or equal to 2, or even to 1 and more preferentially 0, after combustion according to the standardized method of the cone calorimeter ISO 5660-1 or ASTM E 1354.

Preferably, the maximum size of a sample (for which the section is assimilated to a square) may be taken without being broken in the residue obtained after combustion according to the standardized cone calorimeter method ISO 5600-1 or ASTM E 1354, and with a side measuring 100 mm, is greater than or equal to 10 mm, preferably greater than or equal to 30 mm, preferably greater than or equal to 50 mm.

Other embodiments of the combustion residue according to the invention are indicated in the appended claims.

Other features, details and advantages of the invention will become apparent from the description given hereafter, in a non-limiting way and referring to the drawings and to the appended Examples.

Table 1 groups the main features of the hydrated limes with a high specific surface area, no. 1 and no. 2 used in the Examples.

The notation d$_x$ represents a diameter, expressed in µm, relatively to which of the measured particles are smaller.

Table 2 gives the properties of ATH and MDH which are used as reference fillers.

Table 3 groups the main properties of the laboratory fillers with high specific surface area no. 1 and no. 2 used in the Examples.

Table 4 indicates the main characteristics of the standard hydrated limes and with low specific surface area used in the Examples.

Table 5 groups the whole of the values which are used for characterizing the combustion residues obtained at the end of the cone calorimeter test for the different compositions tested in the Examples.

In the figures, identical or similar elements bear the same references.

The present invention therefore relates to a flame-resistant and fire-resistant polymeric composition comprising a polymer and a mineral filler which comprises at least one calcium compound as a calcium hydroxide for which the BET specific surface area is greater than 25 $m^2/g$, preferably greater than 30 $m^2/g$, even more preferentially greater than 35 $m^2/g$ and most preferentially greater than 40 $m^2/g$.

When the filled polymeric composition is raised in temperature, like during a fire for example, different phenomena occur, either independent or not, at various temperatures. There is notably a phenomenon which may be related to intumescence, since the polymeric composition swells and becomes porous. There is also the phenomenon of carbonation of the mineral filler based on $Ca(OH)_2$, a faster and promoted phenomenon when the specific surface area of the mineral filler based on $Ca(OH)_2$ is high, (as illustrated in FIG. 14) and which leads, at the end of the combustion to a cohesive residue having a certain hardness/compressive strength.

Figure 14:
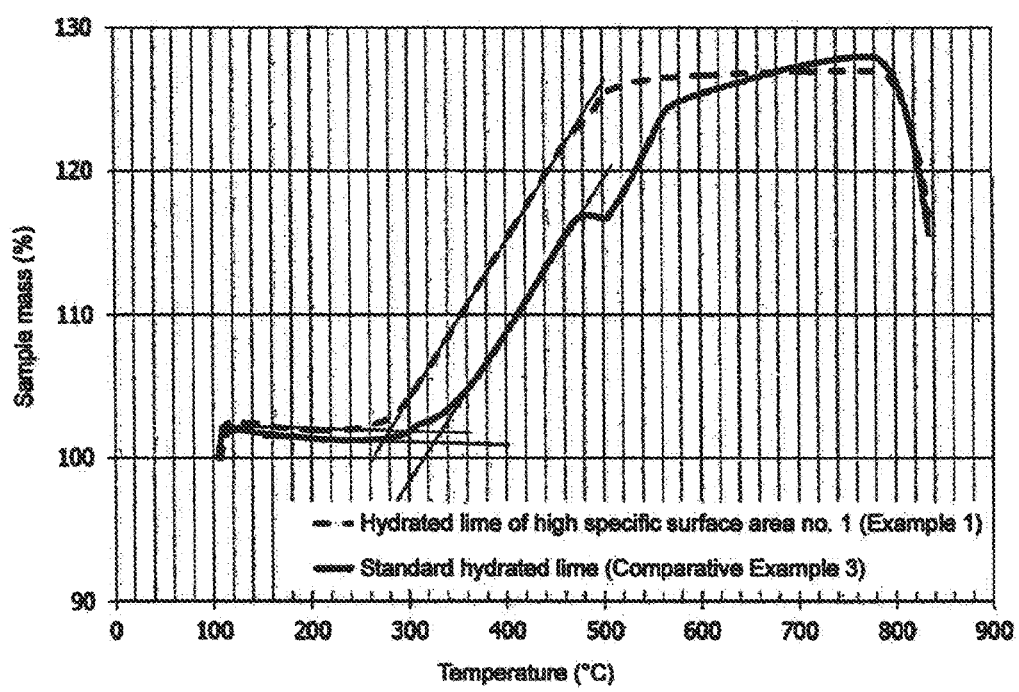
FIG. 14 illustrates a curve showing the carbonation kinetics of lime with a high specific surface area and of standard lime.

FIG. 14, as mentioned earlier, illustrates a curve of the re-carbonation kinetics of lime with a high specific surface area and of standard lime. FIG. 14 shows that the re-carbonation of lime with a high specific surface area is faster than that of standard lime. This measurement was conducted by tracking the mass of a standard hydrated lime or with a high specific surface area during a rising temperature from room temperature to 950° C. at 20° C./min in a $N_2/CO_2$ atmosphere containing about 18% by volume of $CO_2$ ($N_2$ flow rate: 112 ml/min, $CO_2$ flow rate: 24 ml/min). This measurement was conducted on a thermogravimetric Netzsch STA 449F3 apparatus.

Both of these phenomena, i.e. the phenomena which may be related to intumescence and the re-carbonation phenomenon are advantageous with the purpose of improving the fire behavior of polymers, in the sense that the intumescence phenomenon, which limits heat transfers and diffusion of the combustible gases and of oxygen, slows down the combustion of the polymer (flame-retardant), while the carbonation phenomenon of the filler leads to a cohesive residue (fire-resistant).

Nevertheless, a compromise between both of these phenomena generally has to be found in order to optimize the properties of the polymeric compositions. Indeed, if the intumescence phenomenon is too significant or too fast, the combustion residue is highly porous and the size of its pores is large, which leads to poor cohesion and to low compressive strength.

As the intumescence phenomena are related to interactions between the mineral fillers and the polymeric matrices, they are more or less pronounced in different polymeric matrices or in the presence of various fillers.

The mineral filler according to the present invention may also comprise a magnesium compound. This magnesium compound may be added as a mixture or be intimately bound to the calcium compound by carrying out slaking of quicklime with a suspension of magnesium hydroxide.

When these mineral fillers are incorporated into polymers, for example in an amount from 1 to 80% by weight based on the total weight of the composition, an improved flame retarding effect of the filler is obtained as compared with the use of mineral fillers only comprising a calcium compound as described in the invention, the fire-resistant effect being on the other hand more or less reduced according to the proportion of $Mg(OH)_2$ in the filler, since the cohesion of the combustion residue is related to the calcium compound, to its proportion in the composition and to its properties.

When the magnesium compound is present, the specific surface area of the mineral filler slightly decreases but in any case will be greater than 20 $m^2/g$.

These flame-retardant polymeric compositions have the extremely advantageous feature of providing at the end of the combustion, a cohesive residue which in addition to a flame-retardant effect gives the filler a fire-resistant effect sometimes also called a «ceramizing effect».

No standard test is available at the present time for measuring the cohesion of combustion residues of polymeric compositions. In a first phase, the cohesion of the residue may be qualitatively evaluated by a simple observation of the obtained residue at the end of the cone calorimeter test. During this observation, a few quantitative data may however be estimated: i) the number of cracks crossing the residue (transverse cracks); ii) the depth of these cracks (i.e. if the cracks are only present at the surface or whether they cross the whole thickness of the combustion residue); iii) the cohesion may also be represented by the maximum size of the sample (a sample having the whole thickness of the residue and for which the section is assimilated to a square) which may be sampled without being broken in the residue obtained at the end of the cone calorimeter test (which has a square section with a side of 100 mm).

In the sense of the invention, a «transverse crack» designates a crack which crosses right through the combustion residue obtained at the end of the cone calorimeter test and which appears as a sample with a square section with a side of 100 mm. In order to guarantee the cohesion of the residue, in addition to be present in a limited number, these transverse cracks have not to be very deep, i.e. they should not be present over the whole thickness of the residue. Any residue comprising 1 to 10 deep cracks is considered as pretty cohesive. Any residue comprising more than 10 deep cracks is considered as not being cohesive.

Now by considering the maximum size of the sample (the side of the sample having the whole thickness of the residue and for which the section is assimilated to a square) which may be sampled without being broken in the obtained residue at the end of the cone calorimeter test (which itself has a square section with a side of 100 mm), the residue is said to be cohesive if this size is greater than or equal to 10 mm, preferably greater than or equal to 30 mm, preferably greater than or equal to 50 mm.

Moreover, a quantitative method was developed within the scope of this invention in order to determine the mechanical strength of the combustion residues. This method is only applicable for combustion residues in which it is possible to take a sample, the section of which relates to a square with a side of at least 10 mm, i.e., the section of which is at least as large as the surface of the movable plate used for this measurement.

Figure 1:
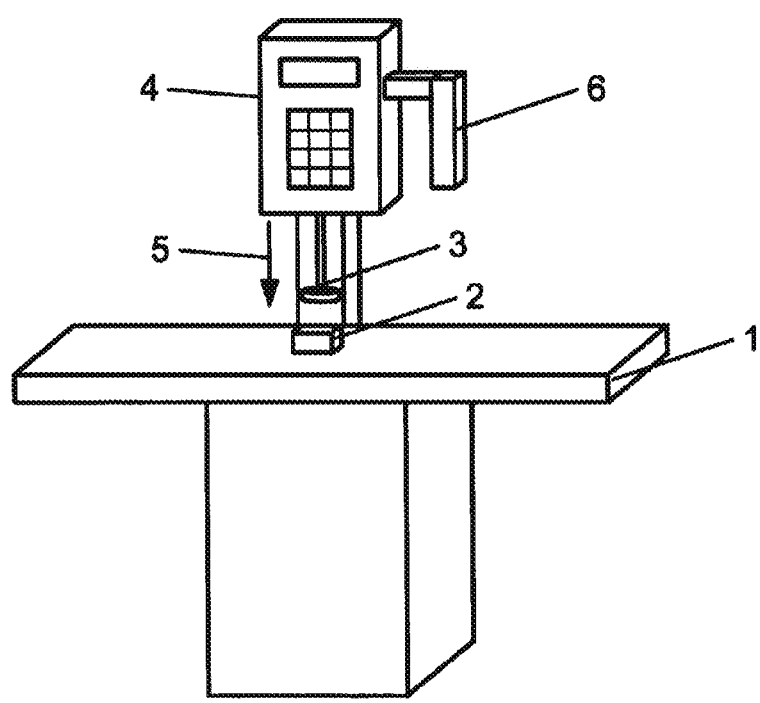
FIG. 1 is a schematic illustration of the device for measuring the mechanical compressive strength of the combustion residues.

It consists of conducting a compressive strength measurement by means of a texturometer Chatillon (model DFGS50) on three samples of a combustion residue. These three samples are taken at different locations in the residue with a square section having a side measuring 100 mm, obtained at the end of the cone calorimeter measurements. The principle of this method is illustrated in FIG. 1. Each sample 2 is placed at the centre of a fixed rectangular metal plate with a measured size of about 100×200 mm. Manually, a second metal plate 3, much smaller this time and circular (with a diameter of 12 mm), is brought, by means of a lever 6 allowing the movable plate to be moved downwards manually, into contact with the sample 2. As this second plate 3 is connected to a force gauge 4, the force applied on the sample by the movable plate at the moment of the total failure of the sample may be determined and is indicated by an arrow 5. The useful value is the average of the breaking forces measured for the three samples of a combustion residue. The measured force is expressed in Newtons (N), but may be standardized by the surface area of the circular movable plate in order to determine the mechanical compressive strength of the residue in Pascals (Pa). Of course, the samples used for this measurement should have a section at least as large as the surface area of the circular movable plate so that the force is applied over the whole surface of this plate.

This method does not allow determination of a single criterion and its result depends on antagonistic effects. Indeed, the more the residue is porous, as a result for example of phenomena assimilated to intumescence, the lower is its compressive strength, although its cohesion may be very good. Conversely, a not very porous residue may have poor cohesion and a high cracking rate while each sample of this residue may have a high strength.

EXAMPLES

Example 1

Use as a flame-retardant filler, of a hydrated lime with a high specific surface area no. 1 in a MDPE polymer composition.

A hydrated lime with high specific surface area no. 1 was obtained industrially by calcination of natural limestone, and then by hydration (slaking) with an excess of water, in an industrial hydrator, of the quicklime obtained after calcination. The produced slaked lime thus has a humidity of 15-30% by mass at the outlet of the hydrator. It is then dried, de-agglomerated and then subjected to an industrial step for grain size separation giving the possibility of removing the coarsest particles. At the end of this industrial manufacturing process, the slaked lime is once again separated with different separation steps in air, at a laboratory scale this time, in order to obtain a fine grain size grade. The properties of this hydrated lime with a high specific surface area no. 1 are grouped in Table 1.

This filler is incorporated in an amount of 50% by mass into a medium density polyethylene matrix (MDPE 3802, a grade for a cable produced by Total) by using a mixer of the Brabender type. Plates, prepared with a hydraulic press, with a size of 100×100×4 mm$^3$ are then subject to the fire test with a cone calorimeter. The residues obtained at the end of the cone calorimeter test (combustion residues) are in a first phase observed and photographed in order to estimate their cohesion degree, and then their mechanical compressive strength is characterized by following the method described earlier in the text.

Figure 3:
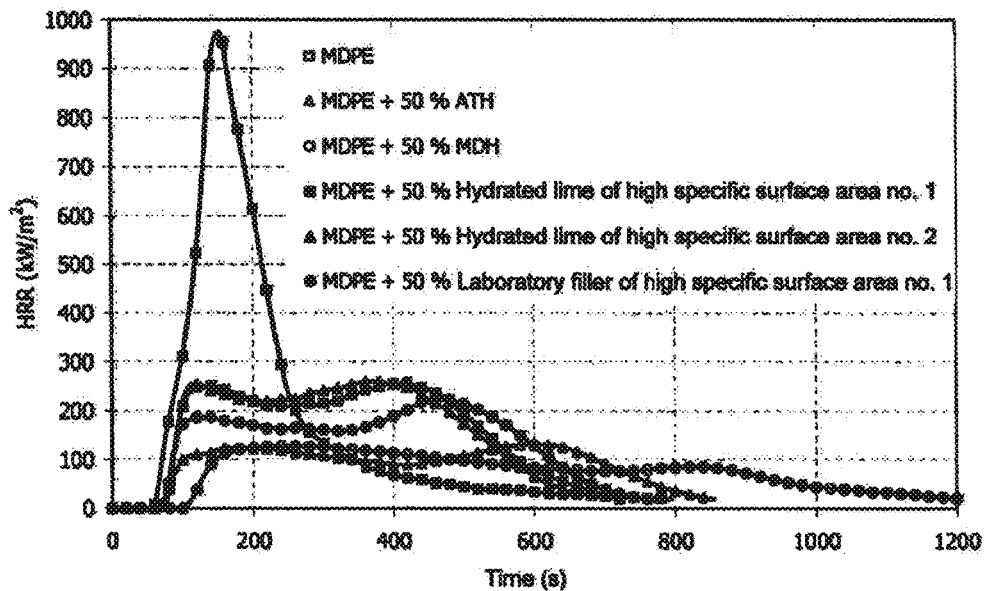
FIG. 3 is a graph illustrating inter alia the fire test results with a cone calorimeter of a flame-retardant polymeric composition according to Example 1.

The results of the fire tests with a cone calorimeter are illustrated in FIG. 3. They are compared with those obtained for the non-filled host polymer (MDPE) and for the same polymer, filled under the same conditions and with the same proportions of ATH (Albemarle Martinal OL 107 LEO, described in Table 2) and of MDH (Albemarle Magnifin H10, described in Table 2).

The cone calorimeter tests conducted for this composition indicate that if the hydrated lime with high specific surface area no. 1 is a less efficient flame-retardant in MDPE than ATH or MDH generally used, mainly because of the higher decomposition temperature of $Ca(OH)_2$ as compared with $Al(OH)_3$ and $Mg(OH)_2$, its flame-retardant role is quite obvious when the curve of the composition of this example is compared with the curve of non-filled MDPE.

Figure 2A:
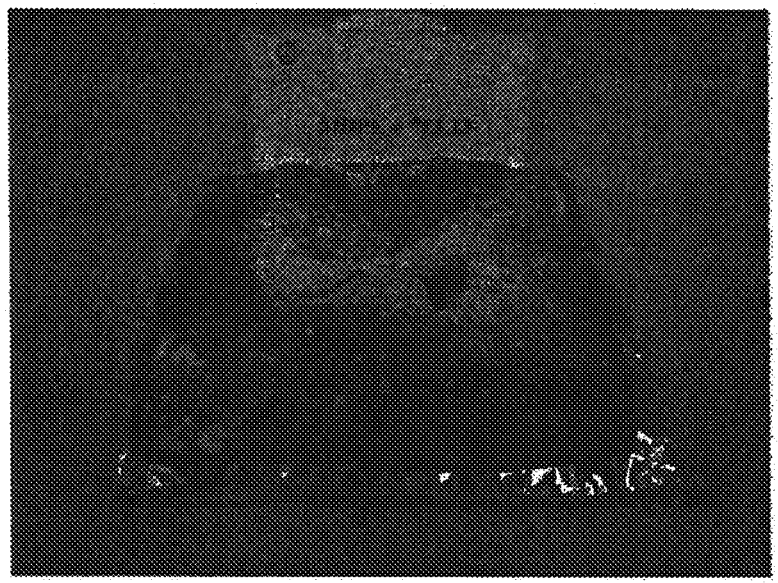
FIGS. 2A and 2B are photographs of the combustion residue of the flame-retardant polymeric composition according to Example 1.
Figure 2B:
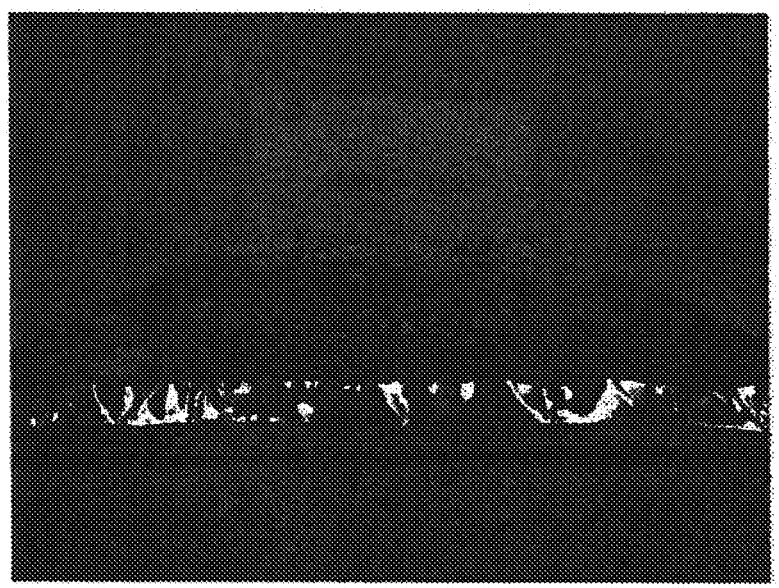

The observation of the combustion residues shown in FIGS. 2A and 2B and characterized in Table 5 allows the conclusion to be drawn that at the end of its combustion, the composition of this example has led to the formation of a cohesive residue: this residue consists of a single non-cracked layer and not of a powder, of an ash or of any other divided material. This residue therefore has a totally different aspect from that of the residues obtained for the compositions based on ATH or MDH which appear as a powder or ash (FIGS. 15A and 15B in the case of ATH and 16A and 16B in the case of MDH). The layer of the residue of this example is 'swollen' and hollow (FIG. 2A). The measurement of the mechanical compressive strength of the residue leads to an average value (over 3 measurements conducted with the piece of equipment shown in FIG. 1 on samples taken at different locations in the combustion residue) of 110 kPa, the three measured values being 71 kPa, 120 kPa and 140 kPa (Table 5).

Example 2

Use as a flame-retardant filler, of a hydrated lime of high specific surface area no. 1 in an ethylene and vinyl acetate co-polymer composition.

The mineral filler of Example 2 is the same as the one used in Example 1, but the polymeric matrix is different in that the MDPE is replaced with an ethylene and vinyl acetate copolymer containing 14% of vinyl acetate (EVA 714, Escorene, Ultra FL00014, produced by ExxonMobil Chemical).

Figure 5:
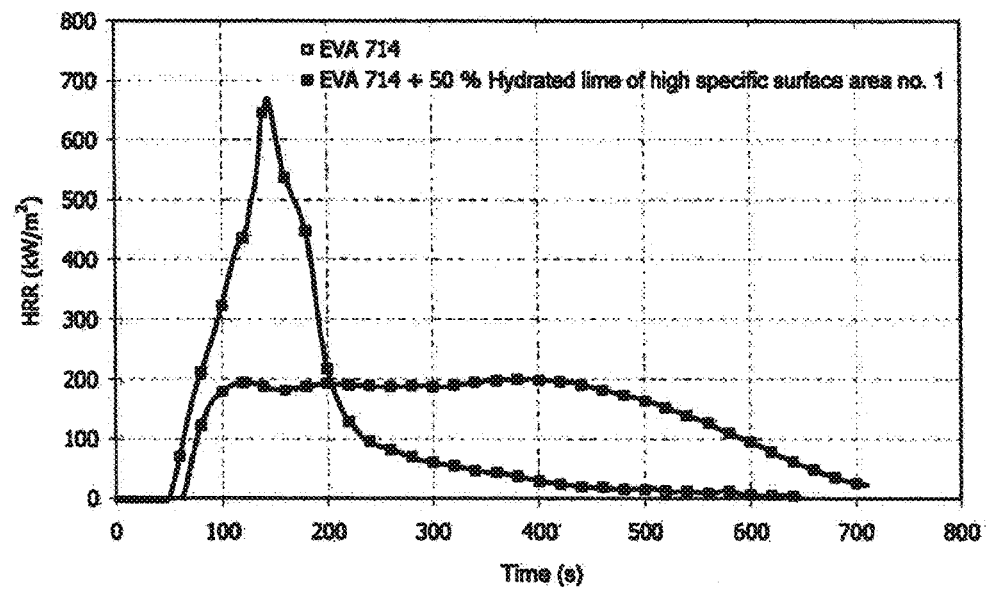
FIG. 5 is a graph illustrating the fire test results with a cone calorimeter of a flame-retardant polymeric composition according to Example 2.

The results of the cone calorimeter fire tests recorded for this composition are illustrated in FIG. 5. They are compared therein with the results obtained for the non-filled host polymer (EVA 714) and again indicate a clear flame-retardant effect of the hydrated lime with high specific surface area no. 1.

Figure 4A:
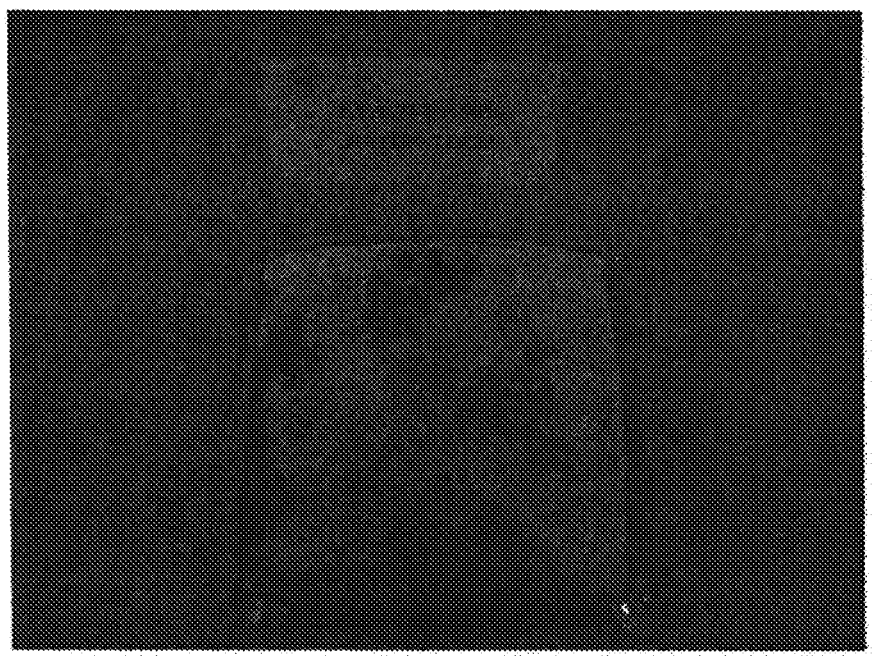
FIGS. 4A and 4B are photographs of the combustion residue of the flame-retardant polymeric composition according to Example 2.
Figure 4B:
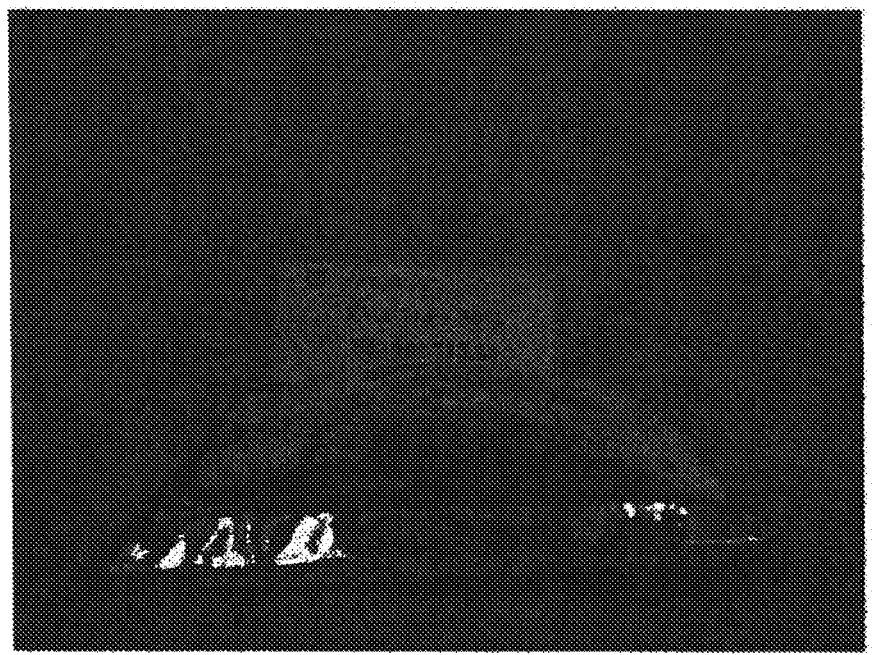

The residues obtained at the end of the cone calorimeter test (combustion residues), were characterized in the same way as in Example 1. The observation of these residues shown in FIGS. 4A and 4B and characterized in Table 5 allows the conclusion to be drawn that at the end of its combustion, the composition of this example has led to the formation of a cohesive residue: this residue consists of a non-cracked single layer, the surface of which is smooth and clean and not of a powder or divided material. The measurement of the mechanical strength of the residue leads to an average value (over 3 measurements conducted on samples taken at different locations in the combustion residue) of 65 kPa, the three measured values being 43 kPa, 59 kPa and 91 kPa.

Example 3

The use as a flame-retardant filler, of a hydrated lime with high specific surface area no. 2 in a MDPE polymer composition.

The hydrated lime used in Example 1 is replaced with a hydrated lime with high specific surface area no. 2, obtained industrially, under the same conditions as the hydrated lime no. 1, but from a different limestone. The properties of the hydrated lime with a high specific surface area no. 2 are grouped in Table 1.

At the outlet of the hydrator, the hydrated lime with a high specific surface area no. 2 is dried, de-agglomerated and roughly separated industrially. Unlike the hydrated lime with a high specific surface area no. 1, no additional grain size separation step is carried out for this hydrated lime with high specific surface area no. 2 after the industrial separation steps. Grain size control is consequently much less extensive than in Example 1, which explains the coarser grain size of the hydrated lime with high specific surface area no. 2.

If the hydrated lime with a high specific surface area no. 2 has a high specific surface area as compared with standard hydrated limes, it is on the other hand substantially lower than that of the hydrated lime no. 1, probably from the fact of more substantial carbonation during drying, de-agglomeration, separation and handling steps, as well as from a more substantial presence of impurities (chemical impurities, unfired substances . . . ) related to a clearly less fine grain size separation than in the case of the lime with a high specific surface area no. 1 of Example 1.

Samples of the composition containing 50% by weight of the hydrated lime with high specific surface area no. 2 and the remainder of MDPE were prepared and characterized (fire test) in the same way as in Example 1. Again, the combustion residues obtained after the cone calorimeter test of the samples of the composition of this example were characterized.

The results recorded during the measurements with the cone calorimeter are compared with those obtained for the non-filled host polymer (MDPE) and for the composition of Example 1 in FIG. 3.

The differences between the hydrated limes with a high specific surface area no. 1 and no. 2, mentioned above, are without any effect on the results of the cone calorimeter tests characterizing the flame-retardant role of the mineral fillers. The curves corresponding to the composition based on both of these hydrated limes are quite similar.

Figure 6A:
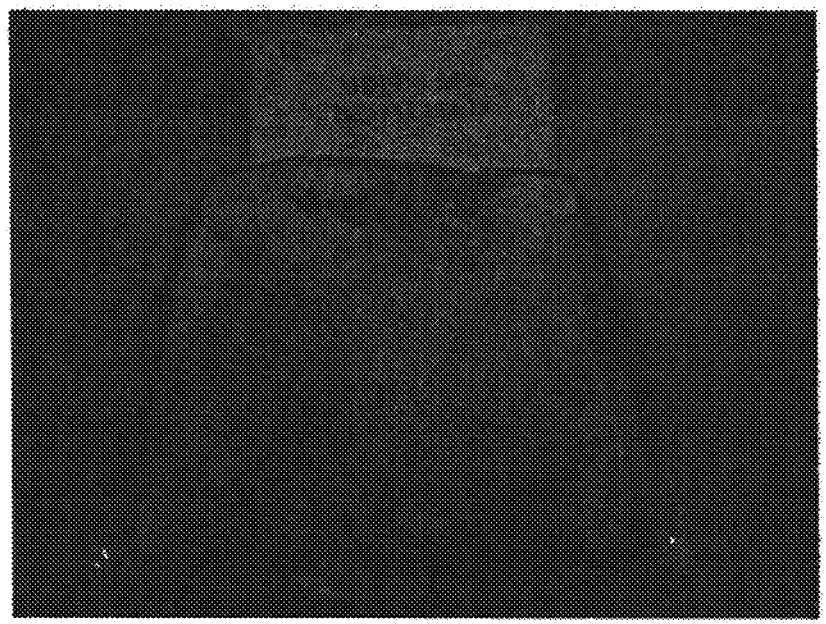
FIGS. 6A and 6B are photographs of the combustion residue of the flame-retardant polymeric composition according to Example 3. For this same composition, the fire test results with a cone calorimeter are illustrated in FIG. 3.
Figure 6B:

The observation of the combustion residue shown in FIGS. 6A and 6B and characterized in Table 5 allows the conclusion to be drawn that at the end of its combustion, the composition of this example has led to the formation of a cohesive residue: This residue consists of a relatively cohesive layer as compared with residues obtained for compositions based on ATH or MDH, the residues of which are similar to a powder or an ash (FIGS. 15A and 15B in the case of ATH and 16A and 16B in the case of MDH), even if this layer is cracked in several locations. The residue comprises two transverse cracks and these cracks are not very deep cracks which do not cross the thickness of the residue. In spite of this cracking, a sample with a section similar to a square with a side of 30 mm may be taken on the whole of the thickness of this residue. Moreover, the measurement of the mechanical strength of the residue leads to an average value (over 3 measurements conducted on samples taken at different locations in the combustion residue) of 20 kPa, the three measured values being 14 kPa, 16 kPa and 31 kPa. The mechanical strength of this residue is lower than that of the combustion residue of Example 1, perhaps because of less good distribution of the filler in the polymeric matrix, which may be related to the clearly coarser grain size of the hydrated lime no. 2 as compared with that of the hydrated lime no. 1 (Table 1).

Example 4

Use as a flame-retardant filler, of a mineral filler consisting of $Ca(OH)_2$ and $Mg(OH)_2$ intimately bound in an MOPE polymer composition.

In this example, the polymeric matrix is MOPE as this was already the case in Examples 1 and 3. On the other hand, unlike the previous examples, the mineral filler was synthesized in the laboratory. The synthesis is achieved in a pilot hydrator, in which quicklime is hydrated in the presence of $Mg(OH)_2$ of commercial origin appearing as an aqueous suspension, or a suspension containing 53% by mass of $Mg(OH)_2$. The quicklime and $Mg(OH)_2$ suspension flow rates are computed so as to obtain, at the outlet of the hydrator, a product containing about 13% by mass of $Mg(OH)_2$ and the remainder of hydrated lime ($Ca(OH)_2$), of impurities and unfired substances. The $Mg(OH)_2$ suspension is diluted, the water brought by the suspension into the hydrator being adjusted so as to have during the hydration reaction a humidity of the product at the outlet of the hydrator of the order of 16 to 22%. Hydration is carried out continuously. As soon as it exits from the hydrator, the product is dried and de-agglomerated. It then passes through the same grain size separation steps as those to which the hydrated lime with a high specific surface area no. 1 shown in Example 1 was subject, in order to obtain a fine grain size grade adapted to the preparation of compositions as described in the invention.

During the synthesis, $Mg(OH)_2$ is not subject to any modification, because of the high humidity of the product at the outlet of the hydrator (excess of hydration water), the calcium portion of the product obtained at the end of the synthesis appears as a $Ca(OH)_2$, therefore a hydrated lime with high specific surface area and porous volume. The thereby synthesized product is therefore an intimate mixture between an $Mg(OH)_2$ with standard properties and a $Ca(OH)_2$ with high specific surface area and porous volume. The mixed product accordingly has also high specific surface area and porous volume, which depend on the mass proportions of $Mg(OH)_2$ and of $Ca(OH)_2$ in the mixture and on their respective specific surface areas and porous volumes. The properties of this mixed product, subsequently called a laboratory filler with high specific surface area no. 1, are grouped in Table 3.

In the same way as in Examples 1 and 3, this filler is incorporated into MDPE in an amount of 50% by weight and the thereby prepared compositions are characterized, just like the combustion residues.

The results of the fire tests with a cone calorimeter are illustrated in FIG. 3. The results recorded for the composition of this example are compared with those obtained for the non-filled host polymer (MDPE) and for the same polymer, filled under the same conditions and with the hydrated limes no. 1 and no. 2 described in Table 1.

Once again, the cone calorimeter test indicates that this filler has a very good flame-retardant effect on MDPE. This effect is better than that of hydrated limes with high specific surface area no. 1 and no. 2 and is close to the effect of MDH, because of the presence in the filler of this example of both a $Ca(OH)_2$ with high specific surface area and a magnesium hydroxide.

Figure 7A:
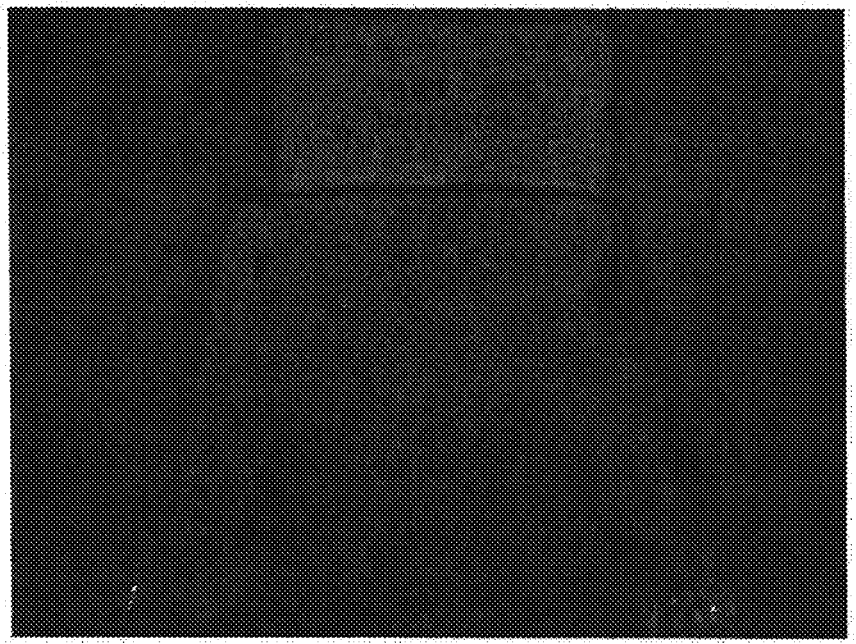
FIGS. 7A and 7B are photographs of the combustion residue of the flame-retardant polymeric composition according to Example 4. For this same composition, the fire test results with a cone calorimeter are illustrated in FIG. 3.
Figure 7B:
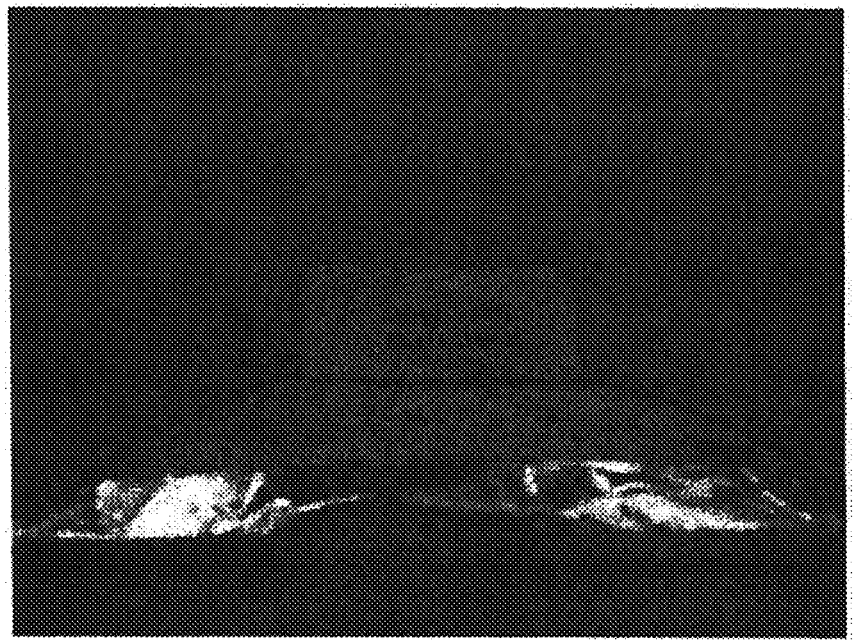
Figure 15A:
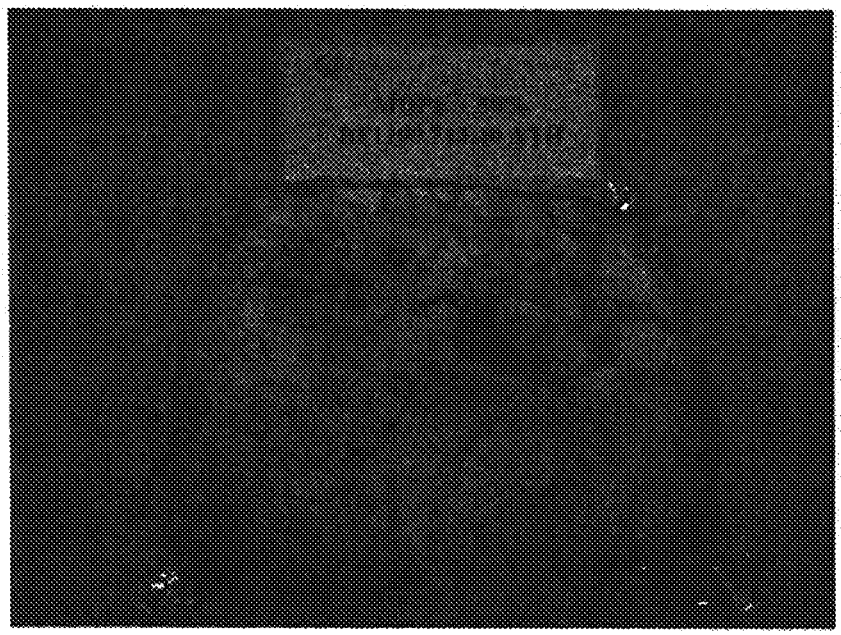
FIGS. 15A and 15B are photographs of the combustion residue of the flame-retardant polymeric composition according to the comparative Example 1.
Figure 15B:
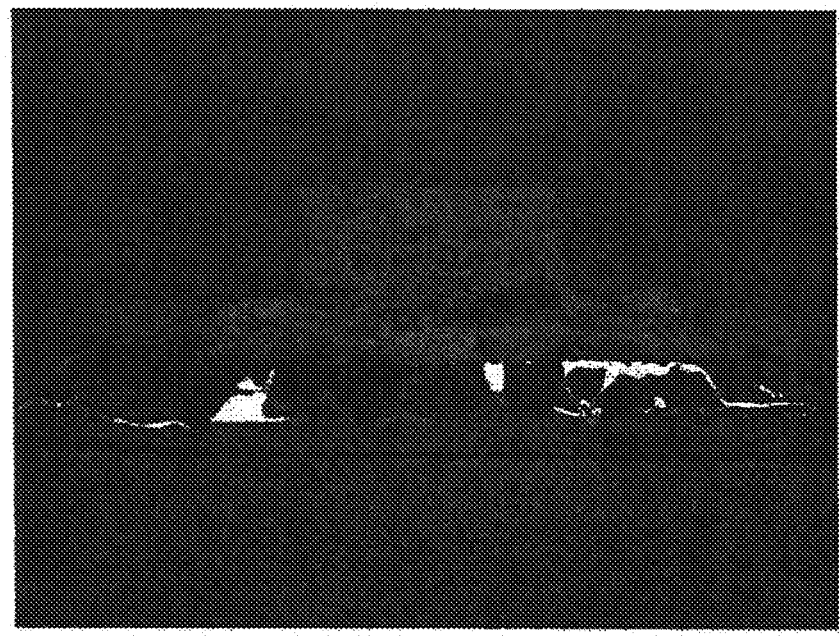

By observing the combustion residues shown in FIGS. 7A and 7B and characterized in Table 5, it is possible to state that at the end of its combustion, the composition of this example has led to the formation of a cohesive residue as compared with the residues obtained for composition based on ATH or MDH, the residues of which are similar to a powder or an ash (FIGS. 15A and 15B in the case of ATH and 16A and 16B in the case of MDH). If the residue of the composition of this example comprises a few cracks, these cracks are on the other hand not transverse and are not very deep. In spite of this surface cracking, a sample with a section similar to a square with a side of 30 mm approximately may be taken on the whole thickness of this residue. Moreover, the measurement of the mechanical strength of the residue leads to an average value (over 3 measurements conducted on samples taken at different locations in the combustion residue) of 38 kPa, the three measured values being 28 kPa, 42 kPa and 43 kPa.

Example 5

Use as a flame-retardant filler, of a mineral filler consisting of $Ca(OH)_2$ and of ATH mixed in a MDPE polymer composition.

The composition of this example is a composition based on MDPE in which the mineral filler is a mixture of two powders. Like in Examples 1, 3 and 4, the mineral filler is incorporated in an amount 50% of the total weight of the composition, but this filler is a mixture of 30% by weight of ATH (Albemarle Martinal OL 107 LEO described in Table 2) and of 20% by weight of hydrated lime with high specific surface area no. 1 as used in Examples 1 and 2 above and the properties of which are repeated in Table 1, these percentages being expressed, based on the total weight of the composition. The mixture of both of these powders is achieved manually, before introduction into the gravimetric metering device which allows control of the mineral filler level in the composition upon preparing the composition.

Like in Examples 1, 3 and 4, this mixture of fillers is incorporated into the MDPE and the thereby prepared compositions are characterized, just like the combustion residues.

Figure 9:
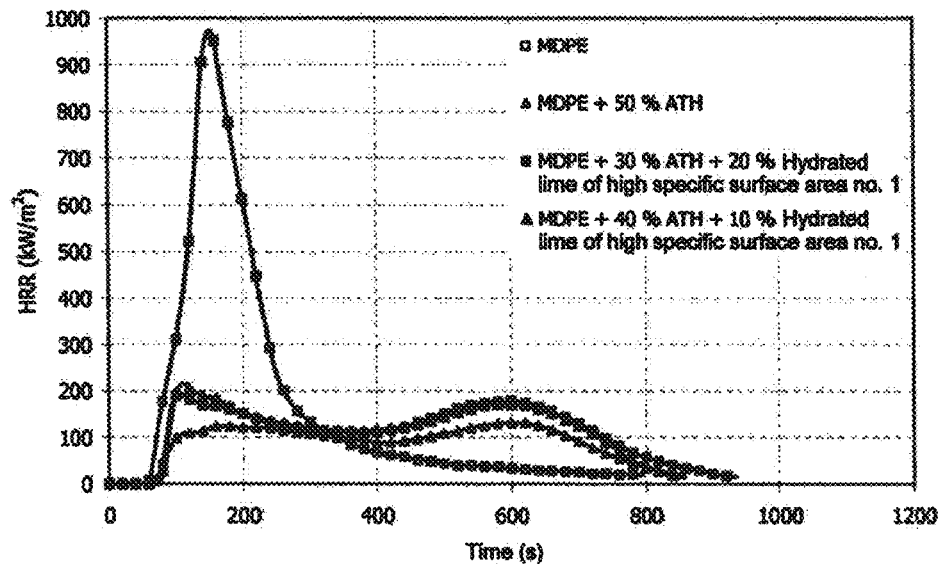
FIG. 9 is a graph illustrating the fire test results with a cone calorimeter of a flame-retardant polymeric composition according to Examples 5 and 6.

The results are compared with those obtained for the non-filled host polymer (MDPE) and for the same polymer, filled under the same conditions and with 50% of ATH. The results of the fire tests with a cone calorimeter are illustrated in FIG. 9.

The results obtained with the cone calorimeter for this composition indicate that the mixture of 30% of ATH+20% of hydrated lime with high specific surface area no. 1 is a flame-retardant almost as efficient as ATH alone. The HRR curve versus time is slightly shifted towards higher values as compared with the composition based on ATH alone, but the general appearance of the curves is comparable.

Figure 8A:
FIGS. 8A and 8B are photographs of the combustion residue of the flame-retardant polymeric composition according to Example 5.
Figure 8B:
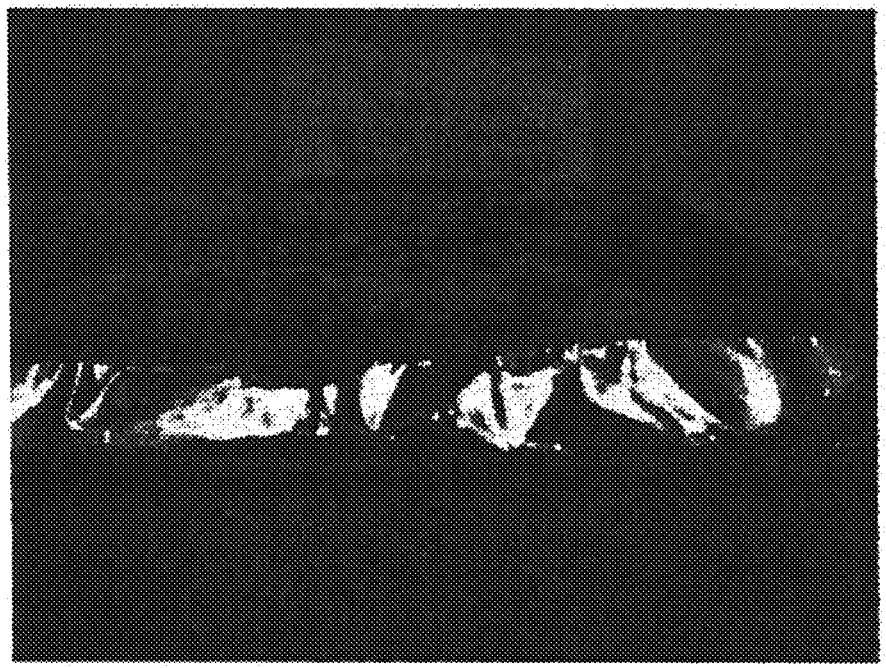

By observing the combustion residue shown in FIGS. 8A and 8B and characterized in Table 5, it is possible to draw the conclusion that at the end of its combustion, the composition of this example has led to the formation of a cohesive residue: this residue is black and covered with white film (most probably $CaCO_3$), it consists of a non-cracked single layer and not of a powder, an ash or any other divided material. This residue therefore has a totally different aspect from that of residues obtained for compositions based on ATH alone, which appear as a divided material in a multitude of small fragments (FIGS. 15A and 15B). The measurement of the mechanical strength of the residue leads to an average value (over 3 measurements conducted on samples taken at different locations in the combustion residue) of 10 kPa, the 3 measured values being 4 kPa, 7 kPa and 19 kPa.

Example 6

Use as a flame-retardant filler, of a mineral filler consisting of $Ca(OH)_2$ and of ATH mixed in a MDPE polymer composition.

This example is similar to Example 5 above, the mineral filler incorporated into the MDPE being always a mixture of ATH and of hydrated lime no. 1. Nevertheless, the proportions of ATH and of hydrated lime with high specific surface area no. 1 are different since this time the composition contains 40% by weight of ATH and only 10% by weight of hydrated lime with high specific surface area no. 1, the percentages being always expressed based on the total weight of the composition.

Like in Example 5, this mixture of fillers is incorporated into the MDPE and the thereby prepared compositions are characterized, just like the combustion residues.

FIG. 9 shows that this composition has a flame-retardant effect similar to the composition of Example 5, a clearly improved behavior as compared with the non-filled polymer and quasi comparable with that of the compositions only containing as a flame-retardant filler, ATH.

Figure 10A:
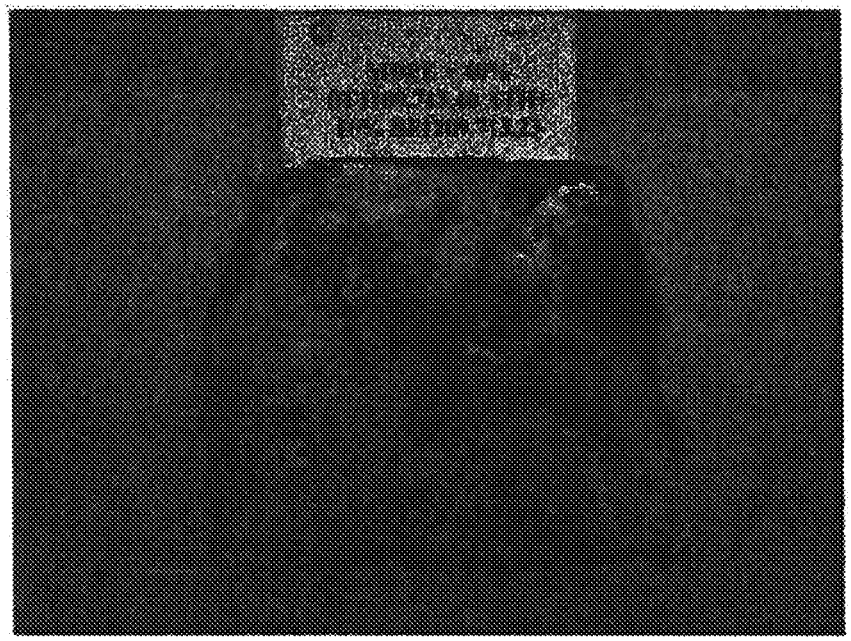
FIGS. 10A and 10B are photographs of the combustion residue of the flame-retardant polymeric composition according to Example 6.
Figure 10B:
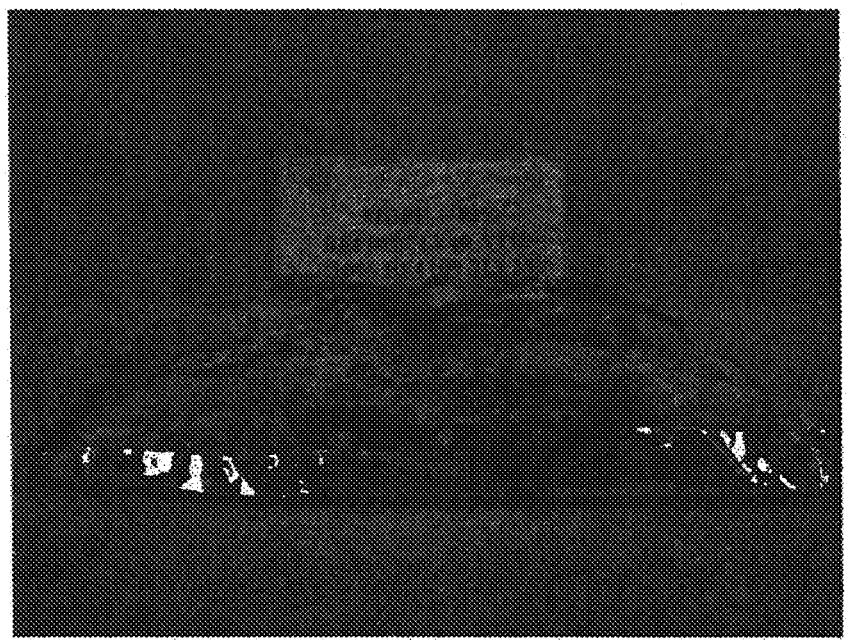

By observing the combustion residues shown in FIGS. 10A and 10B and characterized in Table 5 it is possible to draw the conclusion that at the end of its combustion, the composition of this example has led to the formation of a cohesive residue very comparable to the residue obtained with the composition of Example 5. The measurement of the mechanical strength of the residue leads to an average value (over 3 measurements conducted on samples taken at different locations in the combustion residue) of 4 kPa, the three measured values being 3 kPa, 4 kPa and 4 kPa. The presence of a smaller amount of hydrated lime of high specific surface area in this example as compared with Example 5 may explain the reduction in the mechanical strength of the combustion residue as compared with the mechanical strength of the residue of Example 5.

Example 7

Use as a flame-retardant filer, of a hydrated lime with high specific surface area no. 1 in a polystyrene polymer composition.

Example 7 is similar to examples 1 and 2 but the polymer matrix is different in that MDPE is replaced with polystyrene (PS, Polystyrol VPT0013 GR2).

Figure 12:
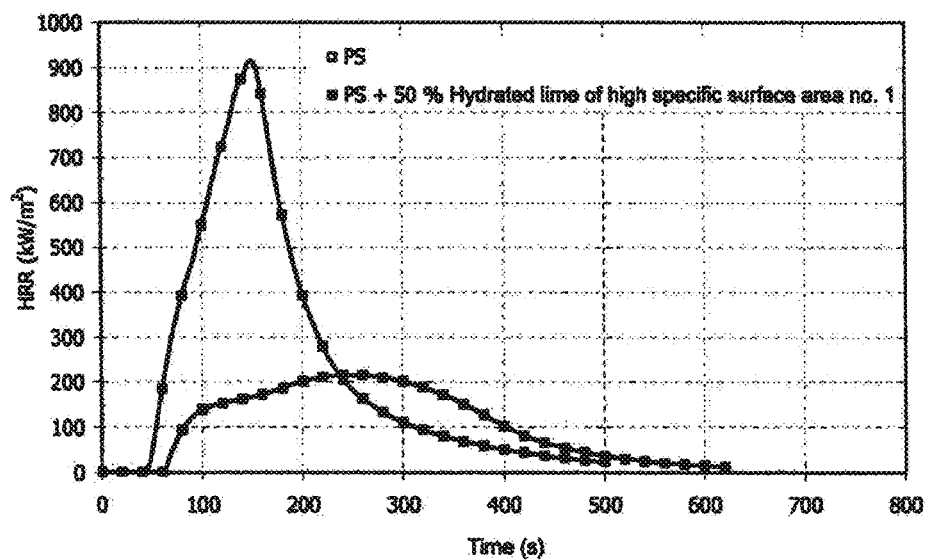
FIG. 12 is a graph illustrating the fire test results with a cone calorimeter of a flame-retardant polymeric composition according to Example 7.

The results of the fire tests with a cone calorimeter recorded for this composition are illustrated in FIG. 12. They are compared therein with the results obtained for the non-filled host polymer (PS) and indicate, once again, a highly significant flame-retardant effect of the hydrated lime of high specific surface area no. 1. The residues obtained at the end of the cone calorimeter test (combustion residues) were characterized in the same way as in Example 1.

Figure 11A:
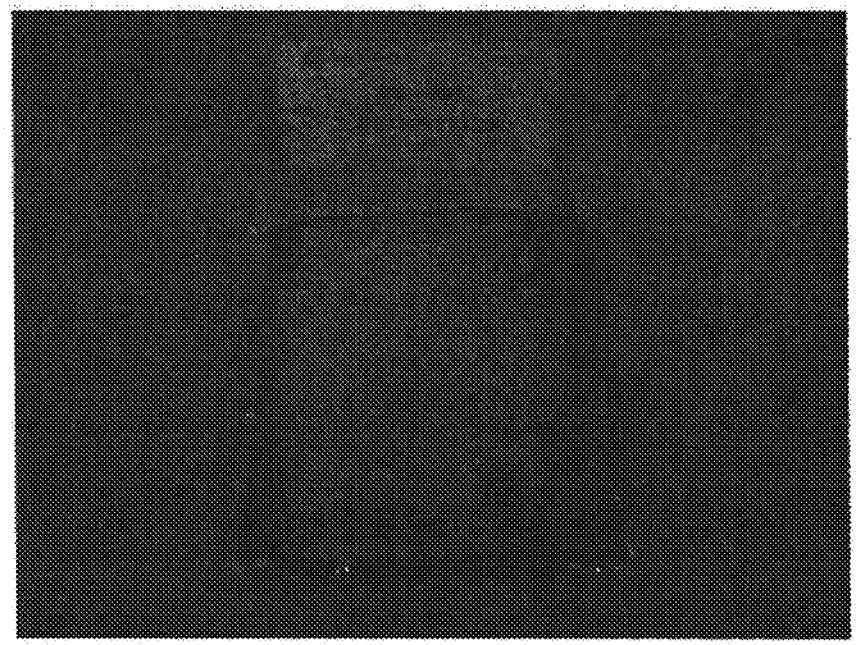
FIGS. 11A and 11B are photographs of the combustion residue of the flame-retardant polymeric composition according to Example 7.
Figure 11B:

By observing the combustion residues shown in FIGS. 11A and 11B and characterized in Table 5, it is possible to state that at the end of its combustion, the composition of this example has led to the formation of a moderately cohesive residue: This residue consists of a single layer and not of a powder or divided material, even if this layer is cracked in several locations. The residue comprises two transverse cracks but which are surface cracks which do not cross the thickness of the residue. In spite of this cracking, a sample with a section similar to a square with a side of about 20 mm may be taken over the whole thickness of this residue. Moreover, the measurement of the mechanical strength of the residue leads to an average value (over 3 measurements conducted on samples taken at different locations in the combustion residue) of 124 kPa, the three measured values being 109 kPa, 128 kPa and 134 kPa. If the cohesion of the combustion residue is not as good for this composition as for the compositions of Examples 1 and 2 above consisting of the same mineral filler but of other polymer matrices, the mechanical strength of the residue is on the other hand very good for the composition of this example.

Example 8

Use as a flame-retardant filler, of a hydrated lime with high specific surface area treated at the surface with calcium stearate in a MDPE polymer composition.

The flame-retardant filler used in the composition of this example is obtained by treating the surface, with calcium stearate, of a hydrated lime with high specific surface area. For this, a hydrated lime with high specific surface area quite comparable with the one used in Example 1 is selected and then 2 kg of this lime are placed in a horizontal plow mixer of the Lodiger brand with a total capacity of 20 $dm^3$ (model M20), heated beforehand to 60° C. Calcium stearate is then added into this mixture in an amount of 4% of the mass of the hydrated lime with high specific surface area (i.e. 80 g of calcium stearate). Stirring in the mixer is started and then the mixture is brought to 200° C. (about 17 minutes are required for heating the mixture from 60 to 200° C.). When this temperature of 200° C. is reached, the mixing continues for 10 minutes at 200° C., before being stopped, and then the product is left at rest until it completely cools down.

This filler treated at the surface is incorporated in an amount of 50% by mass in a matrix of medium density polyethylene (MDPE 3802) by following the same procedure as the one described in Example 1. Plates identical with those of Example 1 are then prepared and used for the cone calorimeter measurements.

Figure 13A:
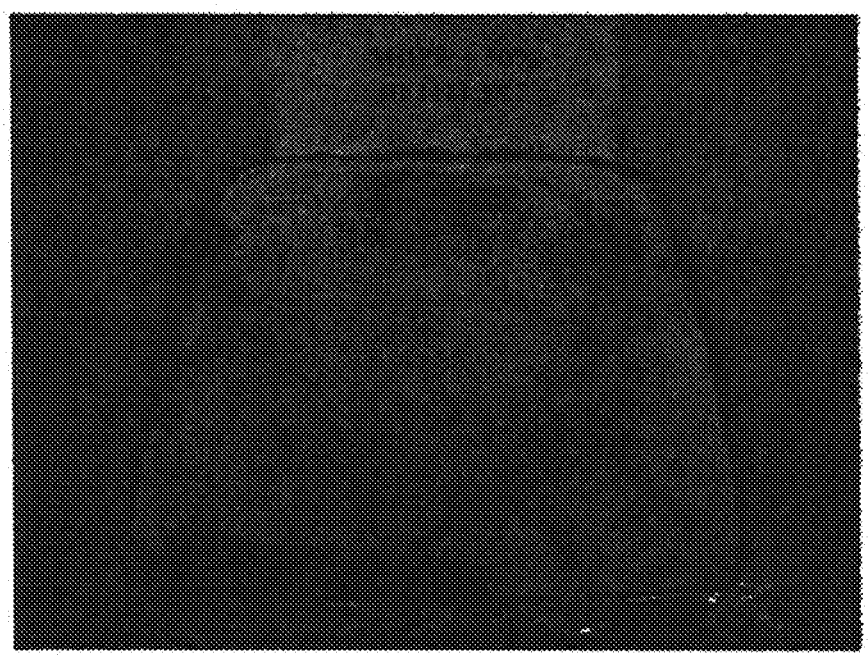
FIGS. 13A and 13B are photographs of the combustion residue of the flame-retardant polymeric composition according to Example 8.
Figure 13B:

If the surface treatment of the hydrated lime with high specific surface area with calcium stearate does not influence the flame-retardant properties of the filler (cone calorimeter results not shown here), this treatment on the other hand seems to promote dispersion of the filler into the polymeric matrix and the contact between the filler and the polymer, thus leading to the formation of a cohesive residue at the end of the combustion. This combustion residue is shown in FIGS. 13A and 13B. When comparing these figures to FIGS. 2A and 2B which illustrate the combustion residue of the composition of Example 1, it is found that the residue from the combustion containing the hydrated lime of high specific surface area treated with calcium stearate is less swollen (less intumescence).

Comparative Example 1

Use as a flame-retardant filler, of ATH in a MDPE polymer composition.

In this comparative example, the polymeric matrix is again MDPE. This time, the filler is no longer a calcium filler with a high specific surface area, but ATH of commercial origin (Albemarle Martinal OL 107 LEO) the main properties of which are indicated in Table 2.

The ATH is incorporated into the polymer matrix in an amount of 50% by weight of the composition by following the procedure described in Example 1 above. As previously, samples of 100×100×4 $mm^3$ are prepared and used for the fire tests with a cone calorimeter (FIG. 3) and the combustion residues collected at the end of the cone calorimeter test are characterized as explained above.

The observation of the combustion residue shown in FIGS. 15A and 15B and characterized in Table 5 indicates that the composition of this example does not lead at the end of the combustion to the formation of a cohesive residue. This residue actually appears as a divided material with a multitude of small fragments (ash or powder). The measurement of the mechanical strength is impossible to carry out on this residue since it is not possible to take samples in this residue which have a section at least as large as the surface area of the circular movable plate used for the measurement (FIG. 1).

Comparative Example 2

Use as a flame-retardant filler, of MDH in an MDPE polymer composition.

This Comparative Example 2 corresponds to the Comparative Example 1 in which ATH is replaced with MDH of commercial origin (Albemarle Magnifin H10) for which the main characteristics are grouped in Table 2.

MDH is incorporated into MDPE in an amount of 50% by weight of the composition by following the procedure described in Example 1 above. As earlier, samples of 100×100×4 $mm^3$ are prepared and tested for the fire tests with a cone calorimeter (FIG. 3) and the combustion residues collected at the end of the cone calorimeter test are characterized as explained above.

Figure 16A:
FIGS. 16A and 16B are photographs of the combustion residue of the flame-retardant polymeric composition according to the comparative Example 2.
Figure 16B:

The observation of the combustion residues shown in FIGS. 16A and 16B and characterized in Table 5 indicates that the composition of this example does not lead, at the end of the combustion, to the formation of a cohesive residue. This residue actually appears as a divided material which may be considered as a powder. For the same reasons as in Comparative Example 1, the measurement of the mechanical strength is impossible to conduct on this residue.

Comparative Example 3

Use as a flame-retardant filler, of a mineral filler consisting of $Ca(OH)_2$ and ATH mixed in a MDPE polymer composition.

The composition of this example is similar to that of Example 5 above insofar that the mineral filler is a mixture of 30% by weight of ATH (Albemarle Martinal OL 107 LEO described in Table 2) and of 20% by weight of hydrated lime, these percentages being expressed, based on the total weight of the composition. Nevertheless, in this comparative example, the hydrated lime is a standard hydrated lime and not a hydrated lime of high specific surface area as this is the case in Example 5. If the hydrated limes with high specific surface area are obtained industrially by hydrating quicklime with an excess of water before being dried and then de-agglomerated, standard hydrated limes are obtained by hydrating quicklime via a dry route and leave the hydrator with sufficiently low humidity so as not to require a drying step (humidity <2% by weight). The main properties of the standard hydrated lime according to this example are repeated in Table 4.

As in Example 5, this mixture of fillers is incorporated into the MDPE and the thereby prepared compositions are characterized, just like the combustion residues.

Figure 17A:
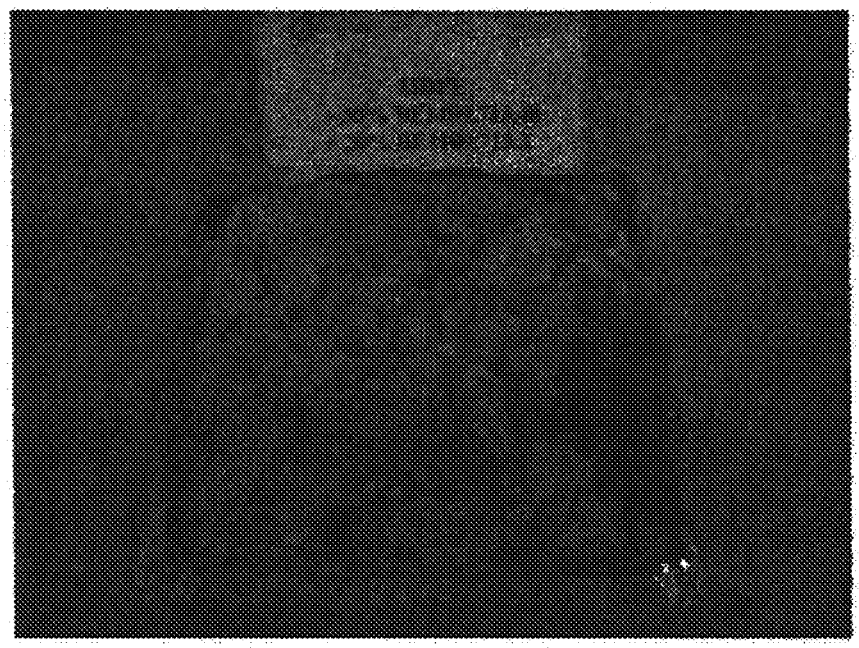
FIGS. 17A and 17B are photographs of the combustion residue of the flame-retardant polymeric composition according to the comparative Example 3.
Figure 17B:

The observation of the combustion residues shown in FIGS. 17A and 17B indicate that the composition of this example leads, at the end of the combustion, to the formation of a non-cohesive residue, unlike the residue from the combustion of the composition of Example 5 shown in FIGS. 8A and 8B. This observation confirms the positive impact of a high specific surface area of the filler on the cohesion of the combustion residue.

Comparative Example 4

Use as a flame-retardant filler, of a hydrated lime with low specific surface area in a MDPE polymer composition.

This comparative example is similar to Comparative Example 3, except that the standard hydrated lime of Comparative Example 3 was replaced with hydrated lime with an even lower specific surface area. This hydrated lime of low specific surface area is industrially synthesized with a method similar to the one used for producing a standard hydrated lime, but by adding during the synthesis, an additive which accelerates the hydration kinetics of quicklime, leads to closing of the porosity and prevents the development of the specific surface area of the hydrated lime. The main characteristics of the hydrated lime of this example are grouped in Table 4.

Figure 18A:
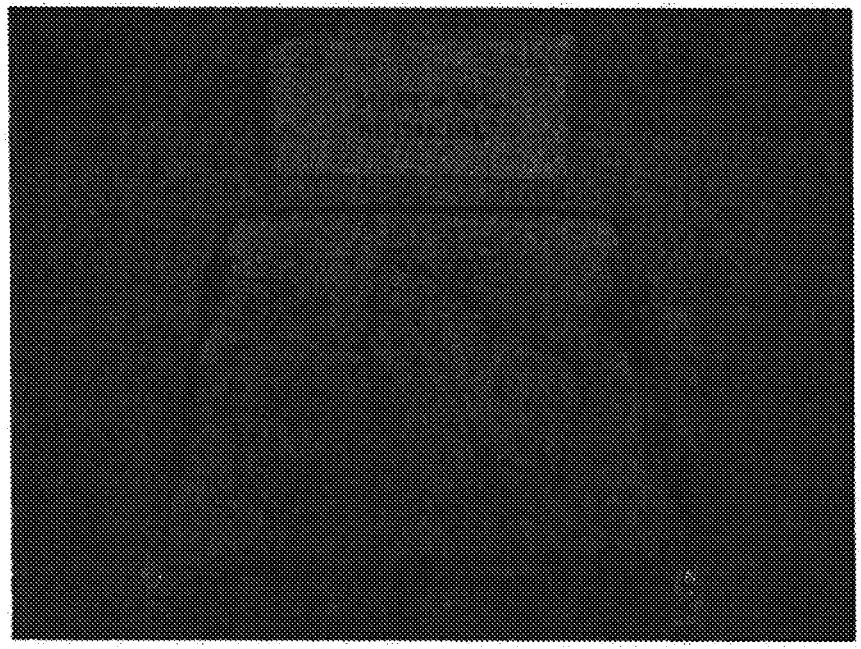
FIGS. 18A and 18B are photographs of the combustion residue of the flame-retardant polymeric composition according to the comparative Example 4.
Figure 18B:
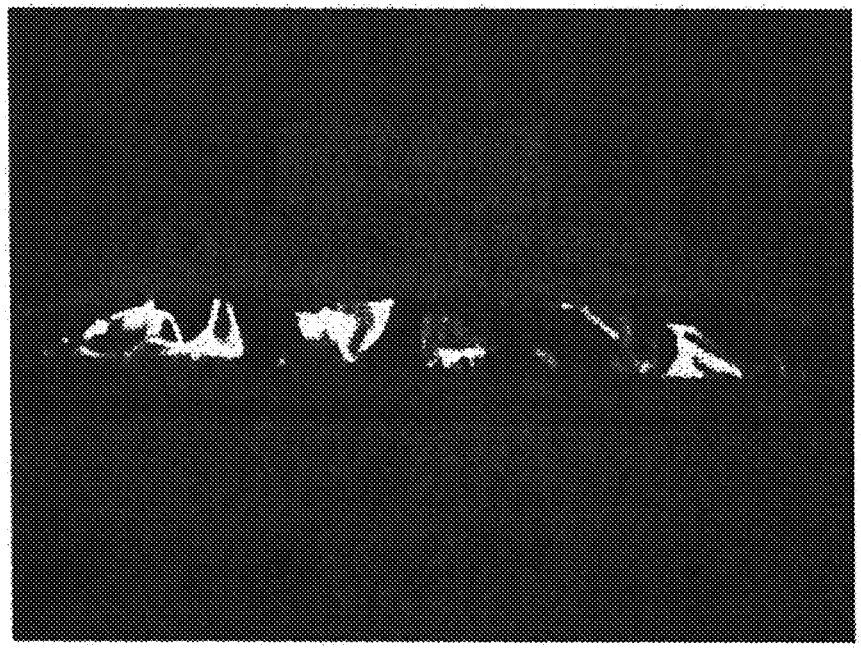

The observation of the combustion residues shown in FIGS. 18A and 18B and characterized in Table 5 indicates that the composition of this example leads, at the end of the combustion, to the formation of a cohesive residue, but this residue is clearly less cohesive than the residues obtained with the composition based on hydrated lime with high specific surface area in Examples 1 and 3. It is even less cohesive than the combustion residue of the composition of Comparative Example 3. This residue actually has 8 to 10 transverse cracks and these cracks are deep. With this cracking, a sample with a section similar to a square with a side of about 10 mm may only be taken over the whole thickness of this residue. Moreover, the measurement of the mechanical strength of the residue leads to an average value (over 3 measurements conducted on samples taken at different locations in the combustion residue) of 8 kPa, the three measured values being 4 kPa, 7 kPa and 14 kPa.

It is quite understood that the present invention is by no means limited to the embodiments described above and that many modifications may be made thereto without departing from the scope of the appended claims.

TABLE 1

| | Hydrated lime of high specific surface area no. 1 (Examples 1, 2, 5, 6 and 7) | Hydrated lime of high specific surface area no. 2 (Example 3) |
|---|---|---|
| $Ca(OH)_2$ (mass %) | 94.6 | 86.2 |
| $CaCO_3$ (mass %) | 4.7 | 11.7 |
| Sum of impurities[1] (mass %) | 0.99 | 2.54 |
| $Fe_2O_3$ (mass %) | 0.09 | 0.26 |
| Humidity at 150° C. (mass %) | 0.86 | 1.33 |
| BET surface area ($m^2$/g) | 41.3 | 36.3 |
| Porous volume ($cm^3$/g) | 0.231 | 0.206 |
| Grain size | | |
| $d_3$ (μm) | 0.9 | 1.1 |
| $d_{10}$ (μm) | 1.3 | 1.8 |
| $d_{50}$ (μm) | 3.5 | 8.9 |
| $d_{90}$ (μm) | 9.8 | 76.4 |
| $d_{97}$ (μm) | 22.7 | 161.2 |
| $d_{100}$ (μm) | 43.7 | 449.7 |
| $Ca(OH)_2$ decomposition T (° C.) | 410-590 | 400-600 |
| 95% T (° C.) | 482 | 490 |

[1]$MgO + SiO_2 + Al_2O_3 + Fe_2O_3 + MnO + P_2O_5 + K_2O + SO_3$

TABLE 2

| | ATH (Examples 5, 6 and Comparative Example 1) | MTH (Comparative Example 2) |
|---|---|---|
| $Al(OH)_3$ (mass %) | 99.8 | — |
| $Mg(OH)_2$ (mass %) | — | 99.9 |
| Sum of impurities[1] (mass %) | 0.19 | 0.03 |
| BET surface area ($m^2$/g) | 5.3 | 9.5 |
| Porous volume ($cm^3$/g) | 0.017 | 0.029 |
| Grain size | | |
| $d_3$ (μm) | 0.6 | 0.5 |
| $d_{10}$ (μm) | 0.9 | 0.7 |
| $d_{50}$ (μm) | 1.8 | 1.7 |
| $d_{90}$ (μm) | 3.5 | 25.0 |
| $d_{97}$ (μm) | 4.4 | 52.6 |
| $d_{100}$ (μm) | 7.4 | 83.9 |
| Hydroxide decomposition T (° C.) | 210-550 | 340-550 |
| 95% T (° C.) | 301 | 413 |

[1]$SiO_2 + CaO + Fe_2O_3 + Na_2O + SO_3 + Cl$

TABLE 3

| | Laboratory filler of high specific surface area no. 1 (Example 4) |
|---|---|
| $Ca(OH)_2$ (mass %) | 76.0 |
| $Mg(OH)_2$ (mass %) | 13.6 |
| $CaCO_3$ (mass %) | 8.8 |
| Sum of impurities[1] (mass %) | 0.98 |
| $Fe_2O_3$ (mass %) | 0.24 |
| Humidity at 150° C. (mass %) | 1.4 |
| BET surface area ($m^2$/g) | 29.5 |
| Porous volume ($cm^3$/g) | 0.151 |
| Grain size | |
| $d_3$ (μm) | 0.7 |
| $d_{10}$ (μm) | 1.0 |
| $d_{50}$ (μm) | 2.7 |
| $d_{90}$ (μm) | 6.8 |
| $d_{97}$ (μm) | 8.6 |

TABLE 3-continued

|   | Laboratory filler of high specific surface area no. 1 (Example 4) |
| --- | --- |
| $d_{100}$ (μm) | 14.3 |
| Mg(OH)$_2$ decomposition T (° C.) | 250-430 |
| Ca(OH)$_2$ decomposition T (° C.) | 430-580 |
| 95% T (° C.) | 400 |

(1) MgO + SiO$_2$ + Al$_2$O$_3$ + Fe$_2$O$_3$ + MnO + P$_2$O$_5$ + K$_2$O + SO$_3$

TABLE 4

|   | Standard hydrated lime (Comparative Example 3) | Hydrated lime of low specific surface area (Comparative Example) |
| --- | --- | --- |
| Ca(OH)$_2$ (mass %) | 92.8 | 96.4 |
| CaCO$_3$ (mass %) | 5.9 | 1.5 |
| Sum of Impurities$^{(1)}$ (mass %) | 1.26 | 1.68 |
| Fe$_2$O$_3$ (mass %) | 0.13 | 0.20 |
| Humidity at 150° C. (mass %) | 0.7 | 6.5 |
| BET surface area (m$^2$/g) | 15.8 | 7.5 |
| Porous volume (cm$^3$/g) | 0.073 | 0.033 |
| Grain size |  |  |
| $d_3$ (μm) | 0.8 | 0.8 |
| $d_{10}$ (μm) | 1.2 | 1.7 |
| $d_{50}$ (μm) | 2.9 | 7.4 |
| $d_{90}$ (μm) | 6.2 | 101.1 |
| $d_{97}$ (μm) | 33.0 | 161.2 |
| $d_{100}$ (μm) | 309.6 | 309.6 |
| Ca(OH)$_2$ decomposition T (° C.) | 400-560 | 400-610 |
| 95% T (° C.) | 455 | 477 |

(1) MgO + SiO$_2$ + Al$_2$O$_3$ + Fe$_2$O$_3$ + MnO + P$_2$O$_5$ + K$_2$O + SO$_3$

TABLE 5

|   | Examples | | | | | | | Comparative Examples | | | |
| --- | --- | --- | --- | --- | --- | --- | --- | --- | --- | --- | --- |
|   | 1 | 2 | 3 | 4 | 5 | 6 | 7 | 1 | 2 | 3 | 4 |
| Number of transverse cracks | 0 | 0 | 2 | 1 | 0 | 0 | 2 | >10 | >10 | >10 | 8-10 |
| Deep cracks | — | — | No | No | — | — | No | Yes | Yes | Yes | Yes |
| Maximum sample size (mm) $^{(1)}$ | — | — | 30 | 30 | — | — | 20 | <10 | <10 | <10 | 10 |
| Average mechanical strength (kPa) | 110 | 65 | 20 | 38 | 9 | 4 | 124 | — | — | — | 8 |
| Minimum mechanical strength (kPa) | 71 | 43 | 14 | 28 | 4 | 3 | 109 | — | — | — | 4 |
| Maximum mechanical strength (kPa) | 140 | 91 | 31 | 43 | 19 | 4 | 134 | — | — | — | 14 |

$^{(1)}$ maximum sample size (sample representing the whole thickness of the residue and the section of which is assimilated to a square) which may be taken without being broken in the residue obtained at the end of the cone calorimeter test which has a measured side of 100 mm.

The invention claimed is:

1. A flame-retardant polymer composition comprising a mineral filler and a polymer, said mineral filler comprising a calcium compound, characterized in that the calcium compound is a fire-resistant additive in the form of calcium hydroxide having a specific surface area computed according to the BET method greater than 25 m$^2$/g and less than 60 m$^2$/g, the mineral filler being incorporated into the flame-retardant polymer composition in an amount from 40 to 75% by weight, based upon the total weight of the flame-retardant polymer composition.

2. The flame-retardant polymer composition according to claim 1, wherein said mineral filler comprising a calcium compound has a porous volume comprised between 0.10 and 0.30 cm$^3$/g.

3. The flame-retardant polymer composition according to claim 2, wherein said mineral filler further comprises at least one magnesium compound, in the form of a magnesium hydroxide, as a flame-retardant additive.

4. The flame-retardant polymer composition according to claim 3, wherein the calcium compound and the magnesium compound of said mineral filler are two separate compounds in a mixture.

5. The flame-retardant polymer composition according to claim 3, wherein the calcium compound and magnesium compound of said mineral filler are intimately bound stemming from slaking of quicklime with a suspension of magnesium hydroxide.

6. The flame-retardant polymer composition according to claim 3, wherein the mineral filler comprising a calcium compound and a magnesium compound has a specific surface area greater than 20 m$^2$/g.

7. The composition according to claim 3, wherein said mineral filler comprises a calcium compound and a magnesium compound has a porous volume greater than 0.10 cm$^3$/g.

8. The flame-retardant polymer composition according to claim 1, wherein said polymer is an organic polymer in particular a thermoplastic, thermosetting or elastomeric organic polymer, of natural or synthetic origin.

9. The flame-retardant polymer composition according to claim 1, wherein said organic polymer is selected from the group consisting of polyethylene, polypropylene, polystyrene, ethylene and propylene copolymer (EPR), ethylene-propylenediene terpolymer (EPDM), ethylene and vinyl acetate copolymer (EVA) having an acetate content below 28% by weight of the copolymer, ethylene and methyl acrylate copolymer (EMA) having an acrylate content below 28% by weight of the polymer, ethylene and ethyl acrylate copolymer (EEA) having an acrylate content below 28% by weight of the polymer, ethylene and butyl acrylate copolymer (EBA) having an acrylate content below 28% by weight of the polymer, ethylene and octene copolymer, a polymer based on ethylene, a polymer based on polypropylene, a polymer based on polystyrene, a halogenated polymer, a silicone and any mixture of these compounds.

10. The flame-retardant polymer composition according to claim 1, wherein the particles of mineral filler have a particle size $d_{90}$ of less than 80 μm.

11. The flame-retardant polymer composition, according to claim 1, wherein the particles of mineral filler have a particle size $d_{97}$ of less than 200 μm.

12. A combustion residue of a flame-retardant composition according to claim 1, characterized in that the residue is a cohesive residue having an average mechanical compressive strength at break which is greater than 3 kPa.

13. The combustion residue according to claim 12, wherein said combustion residue is only crossed by a very limited number of cracks, less than or equal to 3 after combustion according to the standardized method of the cone calorimeter ISO 5660-1 or ASTM E 1354.

14. The combustion residue according to claim 12 having, after combustion according to the standardized method of the cone calorimeter ISO 5660-1 or ASTM E 1354, a maximum size of combustion residue, a section of which is assimilated to a square which may be sampled without being broken in said obtained residue, greater than or equal to 10 mm, from a sample before combustion with a square section of 100 mm.

* * * * *